US011317681B2

(12) United States Patent
Regan et al.

(10) Patent No.: US 11,317,681 B2
(45) Date of Patent: *May 3, 2022

(54) AUTOMATED IDENTIFICATION OF SHOE PARTS

(71) Applicant: NIKE, Inc., Beaverton, OR (US)

(72) Inventors: Patrick Conall Regan, Singapore (SG); Chang-Chu Liao, Douliu (TW); Chih-Chi Chang, Douliu (TW)

(73) Assignee: NIKE, Inc., Beaverton, OR (US)

( * ) Notice: Subject to any disclaimer, the term of this patent is extended or adjusted under 35 U.S.C. 154(b) by 1028 days.

This patent is subject to a terminal disclaimer.

(21) Appl. No.: 15/209,323

(22) Filed: Jul. 13, 2016

(65) Prior Publication Data
US 2016/0316859 A1 Nov. 3, 2016

Related U.S. Application Data

(63) Continuation of application No. 13/299,856, filed on Nov. 18, 2011, now Pat. No. 9,451,810.

(51) Int. Cl.
A43D 11/00 (2006.01)
A43D 111/00 (2006.01)
(Continued)

(52) U.S. Cl.
CPC .............. A43D 11/00 (2013.01); A43D 1/08 (2013.01); A43D 111/00 (2013.01);
(Continued)

(58) Field of Classification Search
CPC ...... G06Q 10/10; G06Q 30/02; G06Q 10/101; G06Q 10/103; G06Q 90/00; A43D 11/00; A43D 1/08; A43D 111/00; A43D 119/00; A43D 117/00; A43D 2200/30; A43D 2200/10; A43D 2200/60; A43D 111/006; B25J 9/1697; B25J 9/16871; B25J 15/00;
(Continued)

(56) References Cited

U.S. PATENT DOCUMENTS 3,220,723 A 11/1965 Jacob
3,357,091 A 12/1967 Reissmueller et al.
(Continued)

FOREIGN PATENT DOCUMENTS

CA 2790521 A1 9/2011
CA 2791913 A1 9/2011
(Continued)

OTHER PUBLICATIONS

Heiml, "WO 2010034044 Method and System for Receiving and/or Processing Objects", Apr. 1, 2010, pp. 35. (Year: 2010).*
(Continued)

Primary Examiner — Rocio Del Mar Perez-Velez
Assistant Examiner — Olvin Lopez Alvarez
(74) Attorney, Agent, or Firm — Shook, Hardy & Bacon, LLP

(57) ABSTRACT

Manufacturing of a shoe or a portion of a shoe is enhanced by automated placement of shoe parts. For example, a part-recognition system analyzes an image of a shoe part to identify the part and determine a location of the part. Once the part is identified and located, the part can be manipulated in an automated manner.

20 Claims, 10 Drawing Sheets

(51) Int. Cl.
*A43D 119/00* (2006.01)
*A43D 1/08* (2006.01)
*B25J 9/16* (2006.01)
*B25J 15/00* (2006.01)
*B25J 15/06* (2006.01)
*A43D 117/00* (2006.01)
*G06T 7/00* (2017.01)
*G06T 7/73* (2017.01)

(52) U.S. Cl.
CPC ........ *A43D 111/006* (2013.01); *A43D 117/00* (2013.01); *A43D 119/00* (2013.01); *B25J 9/1687* (2013.01); *B25J 9/1697* (2013.01); *B25J 15/00* (2013.01); *B25J 15/0071* (2013.01); *B25J 15/0608* (2013.01); *B25J 15/0616* (2013.01); *G06T 7/001* (2013.01); *G06T 7/73* (2017.01); *G06T 7/74* (2017.01); *A43D 2200/10* (2013.01); *A43D 2200/30* (2013.01); *A43D 2200/50* (2013.01); *A43D 2200/60* (2013.01); *G05B 2219/37205* (2013.01); *G05B 2219/37555* (2013.01); *G05B 2219/39107* (2013.01); *G05B 2219/45243* (2013.01); *G06T 2207/30108* (2013.01); *Y10S 901/09* (2013.01)

(58) Field of Classification Search
CPC ................ B25J 15/0616; B25J 15/0608; B25J 15/0071; G06T 7/0044; G06T 7/001; G06T 2207/30108; G06T 7/73; G06T 7/74; Y10S 901/09; G05B 2219/45243; G05B 2219/39107
See application file for complete search history.

(56) References Cited

U.S. PATENT DOCUMENTS

| | | | |
|---|---|---|---|
| 3,464,102 A | 9/1969 | Soloff | |
| 3,848,752 A | 11/1974 | Branch et al. | |
| 4,010,502 A | 3/1977 | Cushing et al. | |
| 4,041,620 A | 8/1977 | Anderson | |
| 4,100,864 A | 7/1978 | Babson et al. | |
| 4,131,918 A | 12/1978 | Pettit et al. | |
| 4,238,524 A | 12/1980 | Laliberte et al. | |
| 4,304,020 A * | 12/1981 | Bonnet | A43D 111/00 12/1 A |
| 4,389,064 A | 6/1983 | Laverriere | |
| 4,452,057 A | 6/1984 | Davies et al. | |
| 4,472,783 A | 9/1984 | Johnstone et al. | |
| 4,639,963 A | 2/1987 | Fisher | |
| 4,671,755 A * | 6/1987 | Graae | A43D 119/00 425/119 |
| 4,745,290 A | 5/1988 | Frankel et al. | |
| 4,765,011 A | 8/1988 | Leeper | |
| 4,769,866 A | 9/1988 | Williams | |
| 4,775,290 A | 10/1988 | Brown et al. | |
| 4,803,735 A * | 2/1989 | Nishida | G06K 9/46 382/151 |
| 4,866,802 A | 9/1989 | Stein et al. | |
| 4,996,012 A | 2/1991 | Gierschewski et al. | |
| 5,027,281 A | 6/1991 | Rekow et al. | |
| 5,036,935 A | 8/1991 | Kohara | |
| 5,050,919 A | 9/1991 | Yakou | |
| 5,083,518 A | 1/1992 | Ciucani | |
| 5,105,564 A | 4/1992 | Motoda | |
| 5,135,569 A | 8/1992 | Mathias | |
| 5,148,591 A | 9/1992 | Pryor | |
| 5,172,326 A | 12/1992 | Campbell et al. | |
| 5,194,289 A | 3/1993 | Butland | |
| 5,218,427 A | 6/1993 | Koch | |
| 5,231,470 A | 7/1993 | Koch | |
| 5,255,352 A | 10/1993 | Falk et al. | |
| 5,259,468 A | 11/1993 | Warren et al. | |
| 5,377,011 A | 12/1994 | Koch | |
| 5,414,617 A | 5/1995 | Pomerleau et al. | |
| 5,427,301 A | 6/1995 | Pham et al. | |
| 5,506,682 A | 4/1996 | Pryor et al. | |
| 5,608,847 A * | 3/1997 | Pryor | A01B 69/008 700/248 |
| 5,609,377 A | 3/1997 | Tanaka | |
| 5,671,055 A | 9/1997 | Whittlesey et al. | |
| 5,768,732 A | 6/1998 | Blanc | |
| 5,772,100 A | 6/1998 | Patrikios | |
| 5,781,951 A | 7/1998 | Federico | |
| 5,784,737 A | 7/1998 | Tsuji | |
| 5,807,449 A | 9/1998 | Hooker et al. | |
| 5,819,016 A | 10/1998 | Watanabe et al. | |
| 5,836,428 A | 11/1998 | Young | |
| 5,876,550 A | 3/1999 | Feygin et al. | |
| 5,920,395 A | 7/1999 | Schulz et al. | |
| 5,968,297 A | 10/1999 | Hooker et al. | |
| 6,009,359 A | 12/1999 | El-Hakim et al. | |
| 6,051,028 A | 4/2000 | McCartney et al. | |
| 6,073,043 A | 6/2000 | Schneider | |
| 6,098,313 A | 8/2000 | Skaja | |
| 6,127,822 A | 10/2000 | Sasahara et al. | |
| 6,293,677 B1 | 9/2001 | Gallucci | |
| 6,301,763 B1 | 10/2001 | Pryor | |
| 6,438,780 B1 | 8/2002 | Hansen et al. | |
| 6,473,667 B1 | 10/2002 | Lee | |
| 6,533,885 B2 | 3/2003 | Davis et al. | |
| 6,599,381 B2 | 7/2003 | Urlaub et al. | |
| 6,611,617 B1 | 8/2003 | Crampton | |
| 6,672,576 B1 | 1/2004 | Walker | |
| 6,718,604 B1 | 4/2004 | Taga et al. | |
| 6,721,444 B1 | 4/2004 | Gu et al. | |
| 6,765,572 B2 | 7/2004 | Roelofs | |
| 6,771,840 B1 | 8/2004 | Ioannou et al. | |
| 6,779,032 B1 | 8/2004 | Hericourt | |
| 6,816,755 B2 | 11/2004 | Habibi et al. | |
| 6,823,763 B1 | 11/2004 | Foster et al. | |
| 6,867,772 B2 | 3/2005 | Kotcheff et al. | |
| 6,900,450 B2 | 5/2005 | Gimenez et al. | |
| 6,952,204 B2 | 10/2005 | Baumberg et al. | |
| 6,979,032 B2 | 12/2005 | Damhuis | |
| 7,065,242 B2 | 6/2006 | Petrov et al. | |
| 7,079,114 B1 | 7/2006 | Smith et al. | |
| 7,204,043 B2 | 4/2007 | Kilgore | |
| 7,296,834 B2 | 11/2007 | Clark et al. | |
| 7,387,627 B2 | 6/2008 | Erb et al. | |
| 7,446,733 B1 | 11/2008 | Hirimai | |
| 7,476,289 B2 | 1/2009 | White | |
| 7,481,472 B2 | 1/2009 | Cawley et al. | |
| 7,620,235 B2 | 11/2009 | Daniel | |
| 7,657,100 B2 | 2/2010 | Gokturk et al. | |
| 7,717,482 B2 | 5/2010 | Iwasaki | |
| 7,881,896 B2 | 2/2011 | Atwell et al. | |
| 7,945,343 B2 | 5/2011 | Jones et al. | |
| 7,991,576 B2 | 8/2011 | Roumeliotis | |
| 8,005,558 B2 | 8/2011 | Waati et al. | |
| 8,035,052 B2 | 10/2011 | De La Ballina et al. | |
| 8,107,721 B2 | 1/2012 | Beardsley et al. | |
| 8,143,494 B2 | 3/2012 | Eby | |
| 8,220,335 B2 | 7/2012 | Dubois et al. | |
| 8,233,667 B2 | 7/2012 | Helgason et al. | |
| 8,545,743 B2 | 10/2013 | Spanks et al. | |
| 8,849,620 B2 | 9/2014 | Regan et al. | |
| 8,966,775 B2 | 3/2015 | Regan et al. | |
| 9,237,780 B2 | 1/2016 | Jurkovic et al. | |
| 9,339,079 B2 | 5/2016 | Lucas et al. | |
| 9,451,810 B2 | 9/2016 | Regan et al. | |
| 9,668,545 B2 | 6/2017 | Jurkovic et al. | |
| 10,241,498 B1 | 3/2019 | Beard et al. | |
| 10,334,209 B2 | 6/2019 | Fu et al. | |
| 10,393,512 B2 | 8/2019 | Regan et al. | |
| 2001/0010249 A1 | 8/2001 | McNichols | |
| 2001/0020222 A1 | 9/2001 | Lee et al. | |
| 2001/0042321 A1 | 11/2001 | Tawney et al. | |
| 2001/0045755 A1 | 11/2001 | Shick et al. | |
| 2002/0024677 A1 | 2/2002 | Metcalfe | |
| 2002/0063744 A1 | 5/2002 | Stephens | |
| 2002/0153735 A1 | 10/2002 | Kress | |

(56) References Cited

U.S. PATENT DOCUMENTS

| | | | |
|---|---|---|---|
| 2002/0193909 A1* | 12/2002 | Parker | B25J 19/023 |
| | | | 700/259 |
| 2003/0038822 A1 | 2/2003 | Raskar | |
| 2003/0062110 A1 | 4/2003 | Urlaub et al. | |
| 2003/0110582 A1 | 6/2003 | Torielli et al. | |
| 2003/0139848 A1 | 7/2003 | Cifra et al. | |
| 2003/0160084 A1 | 8/2003 | Higashiyama | |
| 2003/0189114 A1 | 10/2003 | Taylor et al. | |
| 2003/0231793 A1 | 12/2003 | Crampton | |
| 2003/0231797 A1 | 12/2003 | Cullen et al. | |
| 2004/0022426 A1 | 2/2004 | Carbone, II et al. | |
| 2004/0034963 A1 | 2/2004 | Rogers et al. | |
| 2004/0172164 A1* | 9/2004 | Habibi | B25J 9/1692 |
| | | | 700/245 |
| 2004/0212205 A1 | 10/2004 | Linker | |
| 2005/0050669 A1 | 3/2005 | Castello | |
| 2005/0135670 A1 | 6/2005 | Vaidyanathan | |
| 2005/0154485 A1 | 7/2005 | Popp et al. | |
| 2006/0041448 A1 | 2/2006 | Patterson et al. | |
| 2006/0082590 A1 | 4/2006 | Stevick et al. | |
| 2006/0109481 A1 | 5/2006 | Gallup | |
| 2006/0143839 A1 | 7/2006 | Fromme | |
| 2006/0155417 A1 | 7/2006 | Cremaschi | |
| 2006/0196332 A1 | 9/2006 | Downing et al. | |
| 2006/0221072 A1 | 10/2006 | Se et al. | |
| 2006/0266593 A1 | 11/2006 | Cerreto et al. | |
| 2007/0156362 A1 | 7/2007 | Goode et al. | |
| 2007/0163147 A1 | 7/2007 | Cavanagh et al. | |
| 2007/0228751 A1 | 10/2007 | Viavattine et al. | |
| 2007/0290517 A1 | 12/2007 | Nagai et al. | |
| 2008/0074055 A1 | 3/2008 | Peterson et al. | |
| 2008/0139126 A1 | 6/2008 | Lee et al. | |
| 2008/0143048 A1 | 6/2008 | Shigeta | |
| 2008/0147219 A1 | 6/2008 | Jones et al. | |
| 2008/0189194 A1 | 8/2008 | Bentvelzen | |
| 2008/0192263 A1 | 8/2008 | Wienand et al. | |
| 2008/0197126 A1 | 8/2008 | Bourke et al. | |
| 2009/0287452 A1 | 11/2009 | Stanley et al. | |
| 2010/0036753 A1 | 2/2010 | Harvill et al. | |
| 2010/0040450 A1 | 2/2010 | Parnell | |
| 2010/0149178 A1 | 6/2010 | Yokoyama et al. | |
| 2010/0238271 A1 | 9/2010 | Pfeiffer et al. | |
| 2010/0243030 A1 | 9/2010 | Yago | |
| 2011/0000299 A1 | 1/2011 | Isobe et al. | |
| 2011/0061265 A1 | 3/2011 | Lyden | |
| 2011/0123359 A1 | 5/2011 | Schaaf | |
| 2011/0166694 A1 | 7/2011 | Griffits et al. | |
| 2011/0172797 A1 | 7/2011 | Jones et al. | |
| 2011/0232008 A1 | 9/2011 | Crisp | |
| 2011/0264138 A1 | 10/2011 | Avelar et al. | |
| 2011/0278870 A1 | 11/2011 | Omiya et al. | |
| 2011/0292406 A1 | 12/2011 | Hollenbeck et al. | |
| 2012/0059517 A1* | 3/2012 | Nomura | B25J 9/1612 |
| | | | 700/259 |
| 2012/0126554 A1 | 5/2012 | Becker et al. | |
| 2012/0287253 A1 | 11/2012 | Makover et al. | |
| 2013/0004289 A1 | 1/2013 | Gaudette | |
| 2013/0030773 A1 | 1/2013 | O'Hare | |
| 2013/0111731 A1* | 5/2013 | Onishi | B23P 11/00 |
| | | | 29/428 |
| 2013/0125319 A1 | 5/2013 | Regan et al. | |
| 2013/0127192 A1 | 5/2013 | Regan et al. | |
| 2013/0131854 A1 | 5/2013 | Regan et al. | |
| 2013/0131865 A1 | 5/2013 | Yamane | |
| 2013/0132038 A1 | 5/2013 | Regan et al. | |
| 2013/0174445 A1 | 7/2013 | Hakkala et al. | |
| 2014/0081441 A1 | 3/2014 | Regan et al. | |
| 2014/0096403 A1 | 4/2014 | Regan et al. | |
| 2014/0196307 A1* | 7/2014 | Fremming | A43B 1/0027 |
| | | | 36/15 |
| 2015/0135447 A1 | 5/2015 | Jurkovic et al. | |
| 2015/0139555 A1 | 5/2015 | Jung et al. | |
| 2015/0201709 A1 | 7/2015 | Jurkovic et al. | |
| 2015/0298320 A1 | 10/2015 | Eisele et al. | |
| 2016/0128434 A1 | 5/2016 | Jurkovic et al. | |
| 2017/0105490 A1 | 4/2017 | Makover et al. | |
| 2017/0308066 A1 | 10/2017 | Farren et al. | |
| 2020/0234510 A1 | 7/2020 | Huang et al. | |

FOREIGN PATENT DOCUMENTS

| | | |
|---|---|---|
| CN | 85108140 A | 4/1986 |
| CN | 1293752 A | 5/2001 |
| CN | 1384704 A | 12/2002 |
| CN | 1505997 A | 6/2004 |
| CN | 1753611 A | 3/2006 |
| CN | 1831687 A | 9/2006 |
| CN | 2865565 Y | 2/2007 |
| CN | 2877375 Y | 3/2007 |
| CN | 101040184 A | 9/2007 |
| CN | 101161151 A | 4/2008 |
| CN | 101339640 A | 1/2009 |
| CN | 101388118 A | 3/2009 |
| CN | 101588736 A | 11/2009 |
| CN | 201349600 Y | 11/2009 |
| CN | 101794461 A | 8/2010 |
| CN | 101847173 A | 9/2010 |
| CN | 102076269 A | 5/2011 |
| CN | 102157013 A | 8/2011 |
| CN | 102203550 A | 9/2011 |
| CN | 103153110 A | 6/2013 |
| DE | 3817615 A1 | 8/1989 |
| DE | 4020358 C1 | 8/1991 |
| DE | 10343620 A1 | 4/2005 |
| DE | 102009042303 A1 | 3/2011 |
| EP | 0123173 A2 | 3/1988 |
| EP | 0348311 A1 | 12/1989 |
| EP | 0512773 A1 | 11/1992 |
| EP | 0572123 A2 | 12/1993 |
| EP | 610610 A1 | 8/1994 |
| EP | 0689778 A1 | 1/1996 |
| EP | 0422946 B1 | 6/1996 |
| EP | 0780065 A1 | 6/1997 |
| EP | 0840880 B1 | 3/2002 |
| EP | 1544800 A2 | 6/2005 |
| EP | 2060348 B1 | 2/2011 |
| EP | 0790010 A1 | 4/2011 |
| ES | 2142239 A1 | 4/2000 |
| FR | 2911255 A1 | 7/2008 |
| GB | 699299 A | 11/1953 |
| GB | 2140345 A | 11/1984 |
| JP | 6-195823 A | 7/1994 |
| JP | H06198523 A | 7/1994 |
| JP | 2002217251 A | 8/2002 |
| JP | 2005-228150 A | 8/2005 |
| JP | 2011143497 A | 7/2011 |
| JP | 6198523 B2 | 9/2017 |
| KR | 10-2005-0090168 A | 9/2005 |
| KR | 100656743 B1 | 12/2006 |
| TW | 308528 B | 6/1997 |
| TW | 486614 B | 5/2002 |
| TW | 200907826 | 2/2009 |
| TW | 200916725 | 4/2009 |
| TW | 200925546 A | 6/2009 |
| TW | 200939053 A | 9/2009 |
| TW | 200951399 A | 12/2009 |
| TW | 201017092 A | 5/2010 |
| TW | 201128569 A | 8/2011 |
| WO | 9111885 A1 | 8/1991 |
| WO | 9727451 A1 | 7/1997 |
| WO | 99055186 A1 | 11/1999 |
| WO | 0036943 A1 | 6/2000 |
| WO | 2004/062842 A1 | 7/2004 |
| WO | 2008044943 A1 | 4/2008 |
| WO | 2010014750 A1 | 2/2010 |
| WO | 2010034044 A2 | 4/2010 |

OTHER PUBLICATIONS

Nemec et al, "Automation of Lasting Operation in Shoe Production Industry", 2003, pp. 462-465, downloaded from the internet https://

(56) References Cited

OTHER PUBLICATIONS ieeexplore.ieee.org/stamp/stamp.jsp?tp=&arnumber=1290363 (Year: 2003).*
Nemec et al, "Automation in Shoe Assembly", 2006, p. 5. downloaded from the internet http://conf.uni-obuda.hu/raad2006/Nemec.pdf (Year: 2006).*
Hu et al, "Automatic surface roughing with 3D machine vision and cooperative robot control", Feb. 15, 2007, downloaded from the internet https://pdf.sciencedirectassets.com/271599 (Year: 2007).*
Jin et al., Detection of 3D Curve for Shoe Sole Spraying Based on Laser Triangulation Measurement, Proc. IEEE Int. Conf. on Auto. and Log., Shenyang, China, Aug. 2009, 4 pages.
Non-Final Office Action dated Jan. 23, 2018 in U.S. Appl. No. 14/803,347, 6 pages.
Notice of Allowance dated Dec. 7, 2017 in U.S. Appl. No. 14/586,575, 7 pages.
Final Office Action dated Jul. 11, 2017 in U.S. Appl. No. 14/586,575, 6 pages.
Non-Final Office Action dated Sep. 28, 2017 in U.S. Appl. No. 14/084,365, 18 pages.
Non-Final Office Action dated Oct. 4, 2017 in U.S. Appl. No. 14/468,521, 32 pages.
European Office Action dated Jul. 12, 2017 in European Patent Application No. 15002942.9, 5 pages.
Extended Search Report dated Mar. 13, 2018 in European Patent Application No. 18000089.5, 12 pages.
Anonymous: "David—User Manual Pages—3D Laser Scanning", Feb. 20, 2009 (Feb. 20, 2009), XP055455780, Retrieved from the Internet: URL:https://web.archive.org/web/20111108145812/http://david-laserscanner.com:80/wiki/user_manual/3d_laser_scanning [retrieved on Mar. 1, 2018], pp. 6.
Non-Final Office Action dated Dec. 30, 2016 in U.S. Appl. No. 14/084,365, 12 pages.
Non-Final Office Action cited Jan. 3, 2017 in U.S. Appl. No. 14/586,575, 8 pages.
Zhongxu Hu et al, Computer vision for shoe upper profile measurement via upper and sole conformal matching, Optics and Lasers in Engineering 45 (2007) 183-190.
European Office Action dated Feb. 24, 2017 in European Patent Application No. 12847978.7, 5 pages.
Non-Final Office Action dated Apr. 11, 2017 in U.S. Appl. No. 14/468,521, 32 pages.
Final Office Action dated Apr. 21, 2017 in U.S. Appl. No. 14/084,365, 15 pages.
Non-Final Office Action dated Jun. 5, 2017 in U.S. Appl. No. 14/803,347, 10 pages.
Decision to grant dated Dec. 13, 2018 in European Patent Application No. 15002942.9, 2 pages.
Partial Search Report dated Jan. 23, 2019 in European Patent Application No. 18202180.8, 15 pages.
Extended Search Report dated Jul. 16, 2018 in European Patent Application No. 18000172.9, 10 pages.
International Search Report and Written Opinion dated Apr. 3, 2018 in International Patent Application No. PCT/US2018/013198, 15 pages.
Office Action dated May 7, 2018 in European Patent Application No. 14786585.1, 4 pages.
Notice of Allowance dated May 18, 2018 in U.S. Appl. No. 14/803,347, 5 pages.
Final Office Action dated Jun. 8, 2018 in U.S. Appl. No. 14/468,521, 15 pages.
Final Office Action dated Jun. 13, 2018 in U.S. Appl. No. 14/084,365, 23 pages.
European Extended Search Report dated Jun. 25, 2018 in U.S. Appl. No. 13/299,872, 9 pages.
Notice of Allowance dated Apr. 4, 2019 in U.S. Appl. No. 14/468,521, 12 pages.
Final Office Action dated Apr. 22, 2019 in U.S. Appl. No. 15/940,162, 13 pages.
Non-Final Office Action dated Aug. 21, 2019 in U.S. Appl. No. 15/940,162, 11 pages.
Notice of Allowance dated Sep. 10, 2019 in U.S. Appl. No. 14/084,365, 12 pages.
Communication under Rule 71(3) dated Feb. 5, 2019 in European Patent Application No. 14786585.1, 7 pages.
Communication pursuant to Article 94(3) dated Mar. 22, 2019 in European Patent Application No. 18000271.9, 6 pages.
Extended search report dated May 15, 2019 in European Patent Application No. 18202180.8, 12 pages.
Communication under Rule 71(3) dated Jul. 30, 2019 in European Patent Application No. 18212130.1, 5 pages.
Extended European Search Report received for European Patent Application No. 19185101.3, dated Oct. 23, 2019, 7 pages.
Intention to Grant received for European Patent Application No. 18000271.9, dated Nov. 11, 2019, 8 pages.
Office Action received for European Patent Application No. 18000089.5, dated Nov. 29, 2019, 4 pages.
Extended European Search Report received for European Patent Application No. 19215567.9, dated Feb. 27, 2020, 5 pages.
Extended European Search Report received for European Patent Application No. 20164770.8, dated May 8, 2020, 9 pages.
Notice of Allowance received for U.S. Appl. No. 15/940,162, dated Jan. 31, 2020, 7 pages.
Notice of Allowance received for U.S. Appl. No. 16/238,970, dated Feb. 6, 2020, 10 pages.
Office Action received for European Patent Application No. 18000172.9, dated Feb. 10, 2020, 7 pages.
Notice of Allowance dated Sep. 26, 2018 in U.S. Appl. No. 14/803,347, 6 pages.
Non-Final Office Action dated Nov. 16, 2018 in U.S. Appl. No. 15/940,162, 12 pages.
Intention to Grant received for European Patent Application No. 20164770.8, dated Dec. 8, 2021, 8 pages.
Non-Final Office Action received for U.S. Appl. No. 16/846,129, dated Dec. 9, 2021, 10 pages.
Akella, S., "Robotic Manipulation for Parts Transfer and Orienting", Dec. 1996,The Robotics Institute Carnegie Mellon University Pittsburgh, Pennsylvania 15213, 1996, pp. 1-171.
Final Office Action received for U.S. Appl. No. 16/733,008, dated Jun. 15, 2021, 19 pages.
Final Office Action received for U.S. Appl. No. 16/846,129, dated Sep. 28, 2021, 7 pages.
Intention to Grant received for European Patent Application No. 18000089.5, dated Oct. 15, 2021, 8 pages.
Intention to Grant received for European Patent Application No. 18000172.9, dated Jul. 26, 2021, 6 pages.
Intention to Grant received for European Patent Application No. 19215567.9, dated Jan. 21, 2021, 8 pages.
Non-Final Office Action received for U.S. Appl. No. 16/538,177, dated Jul. 26, 2021, 22 pages.
Non-Final Office Action received for U.S. Appl. No. 16/733,008, dated Mar. 3, 2021, 34 pages.
Non-Final Office action received for U.S. Appl. No. 16/842,379, dated Jun. 18, 2021, 9 pages.
Non-Final Office action received for U.S. Appl. No. 16/846,129, dated Jun. 8, 2021, 13 pages.
Notice of Allowance received for U.S. Appl. No. 16/842,379, dated Oct. 28, 2021, 5 pages.
Office Action received for European Patent Application No. 18202180.8, dated Apr. 8, 2021, 4 pages.
Office Action received for European Patent Application No. 19185101.3, dated Sep. 15, 2021, 5 pages.
Office Action received for European Patent Application No. 20164770.8, dated Mar. 18, 2021, 6 pages.
Kim, J. Y., "CAD-Based Automated Robot Programming in Adhesive Spray Systems for Shoe Outsoles and Uppers", Wiley Periodicals Inc., Journal of Robotic Systems, vol. 21, No. 11, 2004, pp. 625-634.
Wu et al., "Implementation of 5-DOF Apparatus Used for Adhesive Spray and Roughing of Shoe Upper", Proceedings of the IEEE International Conference on Automation and Logistics, Qingdao, China, Sep. 2008, pp. 1408-1413.

(56) References Cited

OTHER PUBLICATIONS

User Manual Pages—Frequently Asked Questions, David Wiki, Dec. 15, 2009, 3 pages.
Intention to Grant received for European Patent Application No. 18000172.9, dated Nov. 29, 2021, 8 pages.

* cited by examiner

AUTOMATED IDENTIFICATION OF SHOE PARTS

CROSS-REFERENCE TO RELATED APPLICATIONS

This application is a continuation of U.S. patent application Ser. No. 13/299,856, titled "AUTOMATED IDENTIFICATION OF SHOE PARTS," which is related by subject matter to concurrently filed U.S. patent application Ser. No. 13/299,827, titled "AUTOMATED 3-D MODELING OF SHOE PARTS;" U.S. patent application Ser. No. 13/299,819, titled "AUTOMATED MANUFACTURING OF SHOE PARTS;" U.S. patent application Ser. No. 13/299,872, titled "AUTOMATED IDENTIFICATION AND ASSEMBLY OF SHOE PARTS;" U.S. patent application Ser. No. 13/299,908, titled "MULTI-FUNCTIONAL MANUFACTURING TOOL;" U.S. patent application Ser. No. 13/299,934, titled "MANUFACTURING VACUUM TOOL;" and U.S. patent application Ser. No. 13/299,890, titled "HYBRID PICKUP TOOL." The entire contents of these applications are incorporated herein by reference in their entirety.

BACKGROUND

Manufacturing a shoe typically requires various assembly steps, such as forming, placing, and assembling several parts. Some methods of completing these steps, such as those that rely heavily on manual execution, can be resource intensive and can have a high rate of variability.

SUMMARY

This summary provides a high-level overview of the disclosure and of various aspects of the invention and introduces a selection of concepts that are further described in the detailed-description section below. This summary is not intended to identify key features or essential features of the claimed subject matter, nor is it intended to be used as an aid in isolation to determine the scope of the claimed subject matter.

In brief and at a high level, this disclosure describes, among other things, manufacturing of a shoe, such as an automated placement of shoe parts. For example, a part-recognition system analyzes an image of a shoe part to identify the part and determine a location of the part. Once the part is identified and located, the part may be manipulated in an automated manner. For example, a first identified part may be placed at a desired location on second identified part. Identified parts may be placed at desired orientations relative to one another.

An exemplary system that positions a shoe part in an automated manner may have various components, such as an image recorder that records an image depicting a representation of an attachment shoe part. The system may also have a part-transfer apparatus that transfers a first shoe part (e.g., attachment shoe part) to a location at which the first shoe part is to be attached to a second shoe part (e.g., a base shoe part). An exemplary system may further comprise multiple cameras positioned at various locations within the system. For example, cameras may be mounted above a shoe part and/or below the shoe part. Cameras may also be positioned at various angles with respect to a shoe part or horizontally to a shoe part. Further, cameras may be mounted directly to the part-transfer apparatus or mounted remotely from the part-transfer apparatus. The cameras may record images of a shoe part prior to the shoe part being acquired by a part-transfer apparatus. Moreover, the cameras may record images of a shoe part while the shoe part is acquired by the part-transfer, such as when the part-transfer apparatus positions the acquired shoe part in front of a camera.

An exemplary system may also comprise a lighting system that illuminates a shoe part, such as by providing a front light or a back light. The lighting system may be integrated directly into the part-transfer apparatus, into the space surrounding the part-transfer apparatus and shoe part, and/or into a supply station that stores a shoe part prior to being acquired by the part-transfer apparatus. The lighting system may be comprised of full spectrum light and/or may be comprised of colored lights that are tailored to create contrast with shoe parts having specific colors.

One or both of the first shoe part (e.g., attachment shoe part) and the second shoe part (e.g., base shoe part) may be identified and/or located in space using systems and/or methods in accordance with the present invention. Moreover, other components may instruct the part-transfer apparatus, such as a computing device that executes various operations. Exemplary operations may derive at least one reference feature from the representation of the first shoe part and determine pixel coordinates of the image that correspond to the at least one reference feature. Additional operations may convert the pixel coordinates of the image to a geometric coordinate in a geometric coordinate system, which maps a three-dimensional space within which the first shoe part is positioned and the part-transfer apparatus operates. Other operations may determine a geometric coordinate that defines a position of the base shoe part.

An exemplary method for positioning a shoe part in an automated manner during a shoe-manufacturing process may have various steps. For example, an image may be received that depicts a two-dimensional representation of an attachment shoe part, which is to be attached to a base shoe part. The two-dimensional representation of the attachment shoe part may be associated with at least one reference feature that is identified. In addition, pixel coordinates of the image may be determined that correspond to the at least one pre-determined reference feature and that may be converted to a geometric coordinate of a geometric coordinate system. Other geometric coordinates may also be determined, such as a part-position coordinate to which the attachment part will be moved. As such, the attachment shoe part may be moved from the geometric coordinate to the part-position coordinate. In a further exemplary method, a part-attachment coordinate may also be determined, such that the attachment shoe part may be attached at the part-attachment coordinate.

BRIEF DESCRIPTION OF THE DRAWINGS

Illustrative examples of the present invention are described in detail below with reference to the attached drawing figures, wherein.

DETAILED DESCRIPTION

The subject matter of certain aspects of the present invention is described with specificity herein to meet statutory requirements. But the description itself is not intended to define what is regarded as an invention, which is what the claims do. The claimed subject matter may comprise different elements or combinations of elements similar to the ones described in this document, in conjunction with other present or future technologies. Terms should not be interpreted as implying any particular order among or between various elements herein disclosed unless explicitly stated.

Figure 1A:
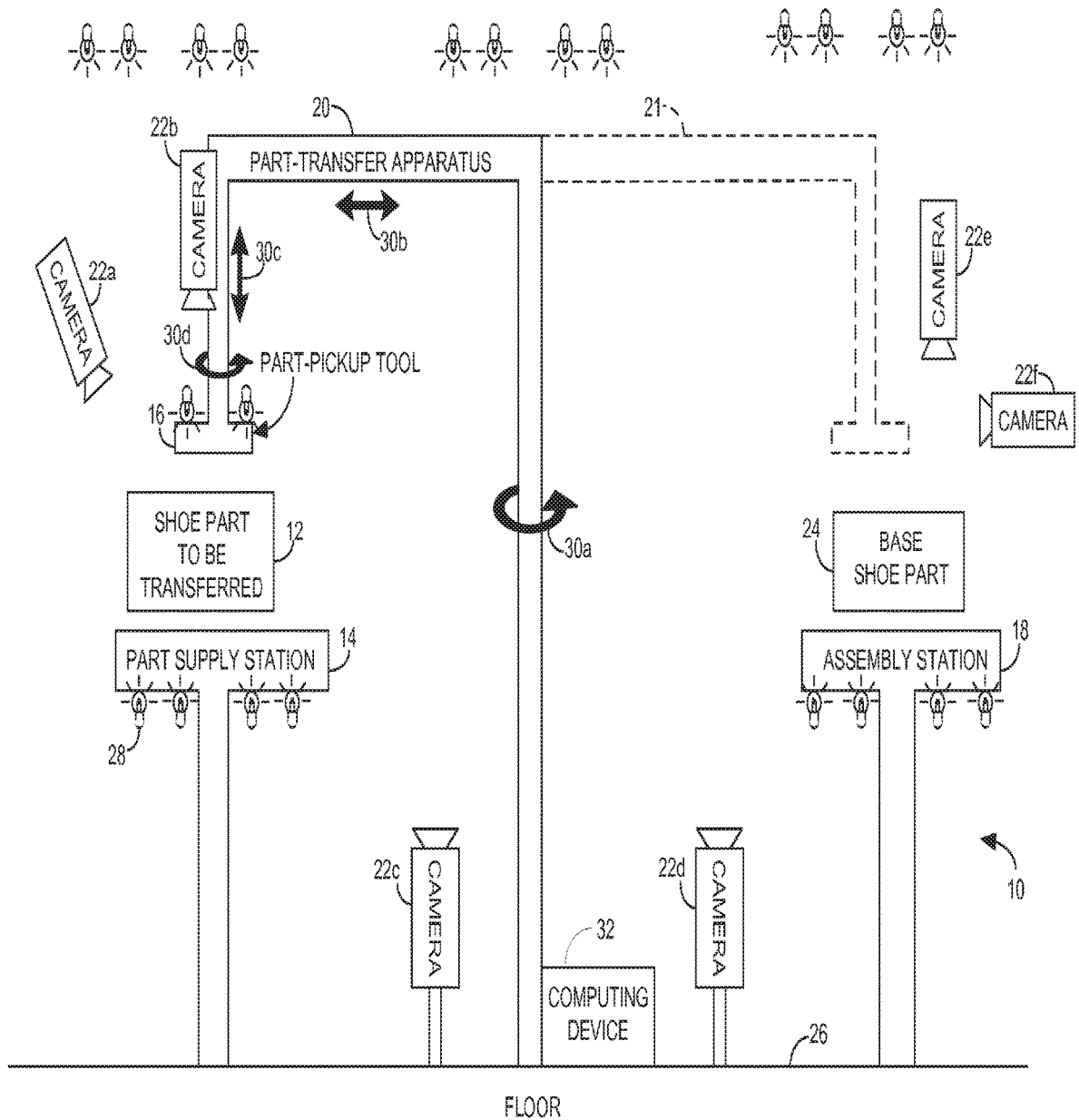
FIG. 1A depicts a schematic diagram of an exemplary system for shoe part identification in accordance with the present invention.

Subject matter described herein relates to an automated placement of a shoe part, and FIG. 1A depicts an exemplary system 10 that may perform various actions in a shoe-manufacturing process. For example, a shoe part 12 may be provided at a supply station 14 together with several other shoe parts. Supply station 14 may provide only a single type of part or multiple types of parts that are identified individually by system 10. Supply station 14 may comprise a conveyor belt, a table, a robotic arm, or any other device that can make shoe part 12 available for identification and/or manipulation in accordance with the present invention. An automated tool 16 may pick up the shoe part 12 from the supply station 14, and the shoe part 12 may be transferred to an assembly station 18 by a part-transfer apparatus 20.

A ghost depiction 21 of part-transfer apparatus is depicted to illustrate that the part-transfer apparatus may move to various positions. Moreover, various arrows 30a-d are depicted that show possible movement directions or rotations of respective components of part-transfer apparatus 20. Part transfer apparatus 20 and the movement directions and rotations depicted by FIG. 1A are exemplary only. For example, arrows 30a and 30d indicate that respective arms of part-transfer apparatus 20 may rotate, whereas arrows 30b and 30c indicate that respective arms may move vertically or horizontally (e.g., in a telescoping manner). Although not depicted, arms of part-transfer apparatus may also be comprised of articulating joints that enable additional ranges of motion of part-transfer apparatus 20. The shoe part 12 that is transferred may function as a base shoe part 24 at the assembly station 18. Alternatively, the shoe part 12 that is transferred may be attached to a base shoe part 24 that is already positioned at the assembly station 18.

When identifying and/or placing shoe part 12 by part-transfer apparatus 20, one or more cameras 22a-f may record images of the shoe part 12 that may be used to recognize the shoe part 12. The cameras 22a-f may be arranged at various positions in system 10, such as above a part supply station (e.g., 22a), on part-transfer apparatus 20 (e.g., 22b), along a floor 26 (e.g., 22c and 22d), and/or above assembly station 18 (e.g., 22e and 22f). In addition, the cameras 22a-f may be arranged at various perspectives, such as vertical (e.g., 22b, 22c, 22d, and 22e), horizontal (e.g., 22f), and angled (e.g., 22a). The number, location, and/or orientation of cameras 22a-f may vary beyond the example illustrated in FIG. 1A.

The images may be used to determine a position and/or orientation of the shoe part 12 relative to part-transfer apparatus 20 and a position to which shoe part 12 is to be transferred. Once the shoe part 12 has been recognized, other shoe-manufacturing processes may be carried out in a manual and/or an automated fashion, such as transferring the shoe part, attaching the shoe part via any attachment method, cutting the shoe part, molding the shoe part, etc.

In a further aspect, information (e.g., shoe-part identity and orientation) obtained by analyzing images of the shoe part 12 may be combined with information derived from other shoe-part analysis systems in order to carry out shoe-manufacturing processes. For example, a three-dimensional (3-D) scanning system may derive information (e.g., shoe-part surface-topography information, shoe-part-size information, etc.) from scans of the shoe part (or from scans of another shoe part that is assembled with the shoe part), and the 3-D-system-derived information may be combined with the shoe-part-identity and/or shoe-part orientation information. That is, the 3-D-system-derived information may be determined upstream and communicated downstream to system 10 (or vice versa).

Information that is combined from different systems may be used in various manners. In an exemplary aspect, if system 10 is used to attach shoe part 12 onto shoe part 24, information obtained from another system may be used to instruct and carry out an attachment method. For example, an amount of pressure may be calculated (based on information provided by another system) that is recommended to be exerted against the shoe part 12 in order to sufficiently attach the shoe part to one or more other shoe parts 24. Such pressure measurements may be dependent on various factors determined and/or communicated from another system, such as a size (e.g., thickness) of the shoe part and/or a number of shoe parts (e.g., layers) that are being attached.

Computing device 32 may help execute various operations, such as by analyzing images and providing instructions to shoe-manufacturing equipment. Computing device 32 may be a single device or multiple devices, and may be physically integral with the rest of system 10 or may be physically distinct from other components of system 10. Computing device 32 may interact with one or more components of system 10 using any media and/or protocol. Computing device 32 may be located proximate or distant from other components of system 10.

Light-emitting devices 28 may be positioned throughout system 10 and may be used to enhance a contrast of shoe part 12 that may be useful when an image of shoe part 12 is used to recognize shoe part 12. Light-emitting devices may be incandescent bulbs, fluorescent devices, LEDs, or any other device capable or emitting light. A light-emitting device may be positioned in various locations, such as near and/or integrated into supply station 14 or part-pickup tool 16. Additionally, a light-emitting device may be positioned near or integrated into assembly station 18. Moreover, light-emitting devices may be positioned throughout the space that surrounds part-transfer apparatus 20, part-pickup tool 16, part supply station 14, assembly station 18, and cameras 22a-f. Varying numbers, types, and positions of light emitting devices may be used in accordance with the present invention. Light emitting devices may be selected based upon the spectrum of light emitted and how that spectrum interacts with spectrums reflected by shoe part 12, supply station 14, assembly station 18, part-pickup tool 16, etc. For example, light-emitting devices may provide full-spectrum light and/or partial-spectrum light (e.g., colored light).

Various aspects of FIG. 1A have been described that may also be applicable to other systems described in this disclosure, such as systems depicted in FIGS. 2, 4, 5, and 6. Accordingly, when describing these other systems, reference may also be made to FIG. 1A and aspects described in FIG. 1A may also apply in these other systems.

As indicated with respect to FIG. 1A, some aspects of the invention are directed to using an image of a shoe part to identify certain shoe-part information, such as an identity of the shoe part and an orientation of the shoe part (e.g., position and rotation). The shoe-part identity and shoe-part orientation may then be used to carry out various shoe-manufacturing steps (e.g., placement, attachment, molding, quality control, etc.). Accordingly, certain processes may be executed before the image is recorded in order to facilitate shoe-part-image analysis, and reference is made to FIG. 1B to describe such aspects.

Figure 1B:
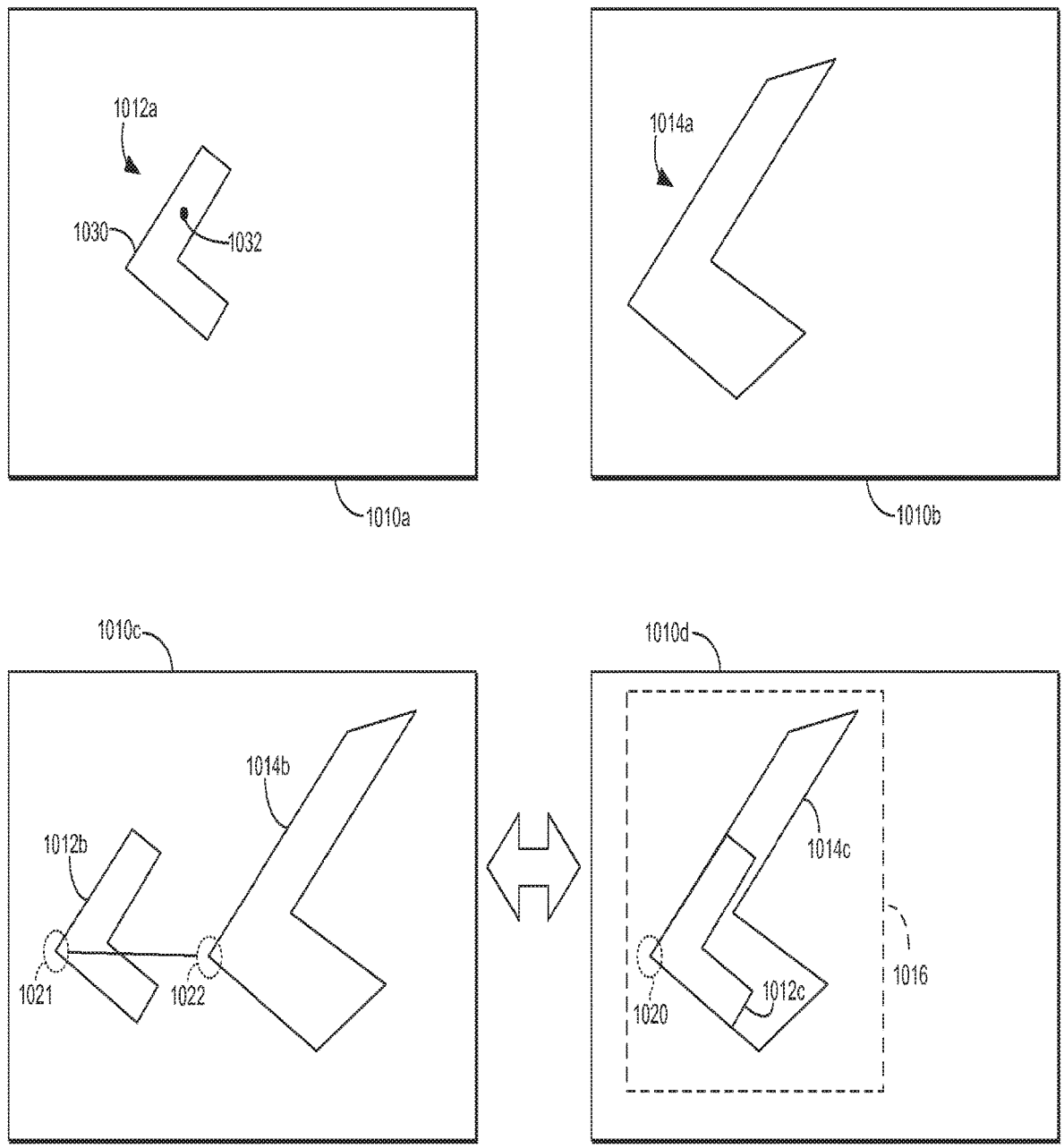
FIG. 1B illustrates exemplary shoe-part references that may be generated and analyzed in accordance with the present invention.

FIG. 1B illustrates various depictions 1010a-d, each of which provides one or more exemplary shoe-part reference patterns or models (hereinafter known as shoe-part references). For example, depiction 1010a provides an exemplary shoe-part reference 1012a, and depiction 1010b provides a different shoe-part reference 1014a. Depictions 1010a-d may represent data that is maintained in a computer-storage medium and is retrievable to execute computing functions. For example, depictions 1010a-d may be stored in a computer-storage media as reference models or patterns and retrieved in order to be viewed on a computing output device (e.g., computer display monitor).

Shoe-part references 1012a and 1014a may be determined and/or created using various techniques, such as by using a computer-assisted drawing program, an automatic shape-outlining computer program, or other boundary-determination computer program. For example, an electronic image of a shoe part may be recorded and analyzed by the automatic shape-outlining computer program, which automatically traces boundaries or perimeters of shapes that comprise the shoe part. In another aspect, shapes depicted in an electronic image of a shoe part may be manually traced using a computer-drawing application. In another example, a shoe part and/or a boundary associated therewith may be manually drawn using a computer-drawing application. FIG. 1B depicts that shoe-part references may be comprised of a shoe-part perimeter or boundary (e.g., 1030), as well as an interior portion (e.g., 1032) bound by the perimeter 1030. As previously indicated, once created, a shoe-part reference may be electronically stored (e.g., item 234 in FIG. 2) and used in various manners, such as to analyze shoe-part images.

In one aspect, a shoe-part reference (e.g., shoe-part reference 1012a) is created such that it may be scaled to correspond to a multiple of different shoe sizes. For example, a shoe-part reference corresponding to a model size (i.e., a model size for females and a model size for males) is created and all other matching shoe-part references are scaled off of the shoe-part reference corresponding to the model size. A shoe-part reference may be scaled up to, for example, five times to account for the different sizes. Further, the shoe-part reference can be scaled to allow for expansion and/or shrinkage for any particular size.

Continuing, references 1012a and 1014a may be used to determine reference information, which may be subsequently used to assemble shoe parts. For example, an attachment shoe part (e.g., 224 in FIG. 2) may be positioned relative to a base shoe part (e.g., 226 in FIG. 2); however, before the attachment shoe part is positioned, it may be helpful to determine a placement location at which the attachment shoe part should be positioned.

As such, in an illustrative aspect, depiction 1010c comprises a reference 1014b, which represents a physical boundary of a base shoe part, and a reference 1012b, which represents a physical boundary of an attachment shoe part. In an exemplary aspect, reference 1012b may be positioned to overlay reference 1014b and may be aligned with at least a portion of the reference 1014b. For example, boundary 1012b may be manually and/or automatically positioned (e.g., drag via input device) in a manner that is consistent with how an attachment shoe part would be arranged onto a base shoe part when the attachment shoe part will be attached to the shoe part. As such, depiction 1010d illustrates a digitally rendered assembly of references 1016, which is comprised of reference 1012c aligned with reference 1014c in a position consistent with an attachment position.

In a further aspect of the invention, a reference feature 1020 may be identified that aligns a portion of reference 1012c with a portion of reference 1014c. As such, each of references 1012c and 1014c comprises respective reference features that are generally aligned with one another. These respective reference features are shown in depiction 1010c and are identified by reference numerals 1021 and 1022. For example, a respective reference feature may be used to determine an orientation (e.g., position and rotation) of a shoe part, as well as a portion of the shoe part that aligns with another shoe part.

Figure 2:
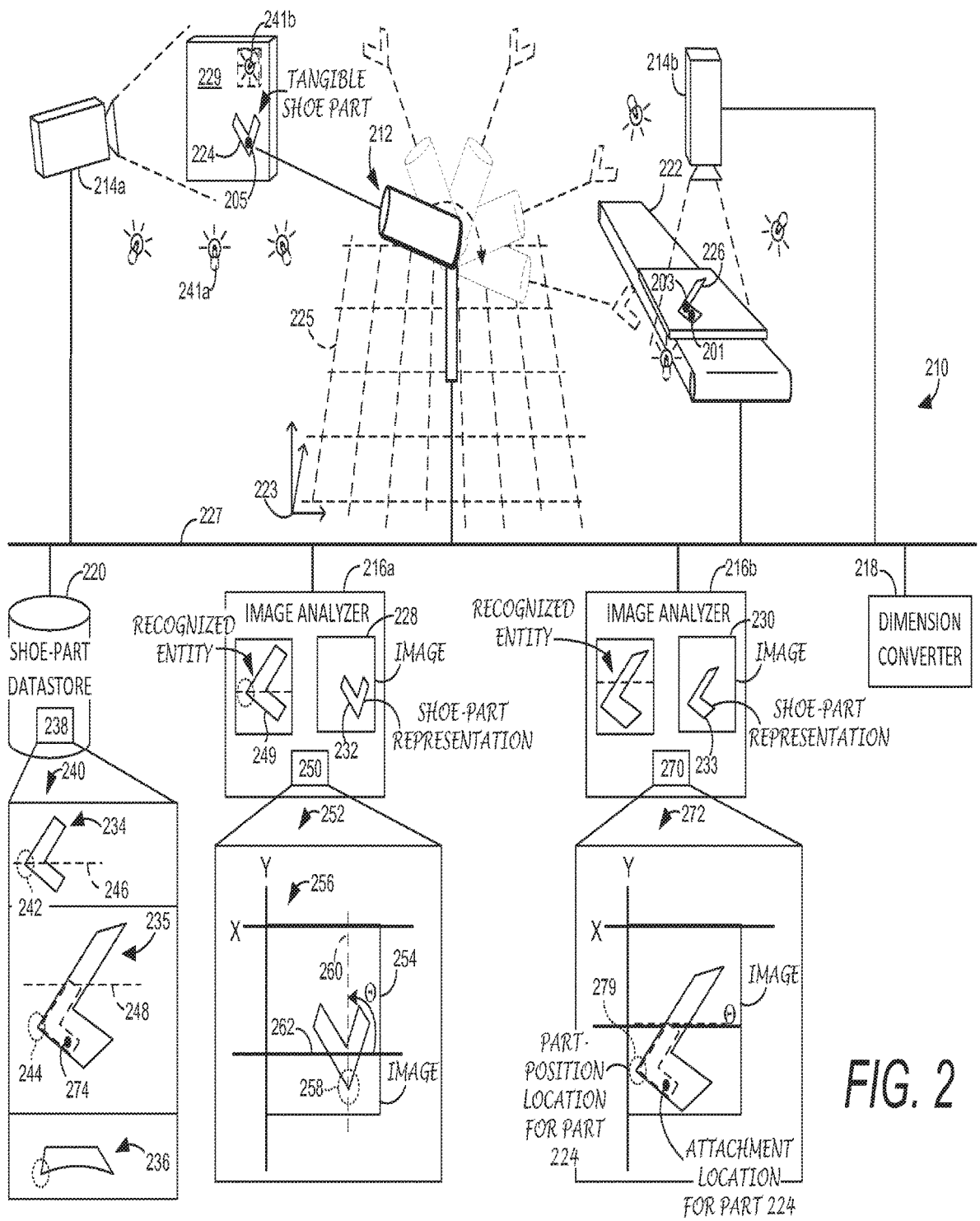
FIG. 2 depicts a schematic diagram of an exemplary system for shoe-part identification in accordance with the present invention.

Now described is FIG. 2, in which an exemplary shoe-manufacturing system 210 is depicted. System 210 may have a combination of shoe-manufacturing equipment and computing devices, which may assist in determining automated operations of the equipment. Operations carried out in system 210 may facilitate manipulation of shoe part 224 and shoe part 226, such as by transferring shoe part 224 and attaching shoe part 224 onto shoe part 226. For example, shoe parts 224 and 226 may comprise two different pieces of flexible material, which are attached to one another to form part of a shoe upper. Shoe parts 224 and 226 may comprise the same or different types of flexible material, such as textiles, leathers, TPU materials, etc. Shoe parts 224 and 226 may be physical structures of the completed shoe and/or a component, such as an adhesive film, that may be used to join shoe components during the shoe manufacturing process.

A part-transfer apparatus 212, cameras 214a and 214b, and conveyor 222 are examples of shoe-manufacturing equipment. A grid 225 is depicted in FIG. 2 (in broken lines) to convey that one or more items of the shoe-manufacturing equipment have a known position within a coordinate system (e.g., geometric coordinate system mapping a 3-D space within which the equipment is positioned). Other items, such as shoe parts, may be moved to known distances within the coordinate system. Although for illustrative purposes grid 225 only depicts two coordinates, axis arrows 223 depict three axes.

Image analyzers 216a and 216b and dimension converter 218 represent operations and/or modules that may be carried out by a computing device. Moreover, FIG. 2 depicts that the shoe-manufacturing equipment may communicate with (i.e., be networked with) computing devices that execute the depicted operations by way of a network connection 227. For example, as will be described in more detail below, image analyzers 216a and 216b may evaluate images recorded by cameras 214a and 214b to recognize shoe parts being utilized in the shoe manufacturing process. In addition, image analyzers 216a-b and dimension converter 218 communicate instructions to part-transfers apparatus 212. One example of this type of vision recognition system includes Cognex® machine vision systems.

Components depicted in system 210 cooperate in different ways to assist in carrying out various steps of a shoe-manufacturing method. For example, some components of system 210 may operate collectively as part of a two-dimensional ("2-D") part-recognition system, which is used to determine various shoe-part characteristics, such as shoe-part identity and shoe-part orientation (e.g., placement and rotation) relative to part-transfer apparatus 212. For example, a part-recognition system may comprise cameras 214a-b, image analyzers 216a-b, shoe-part datastore 220, dimension converter 218, and some or all of part-transfer apparatus 212.

Figure 3:
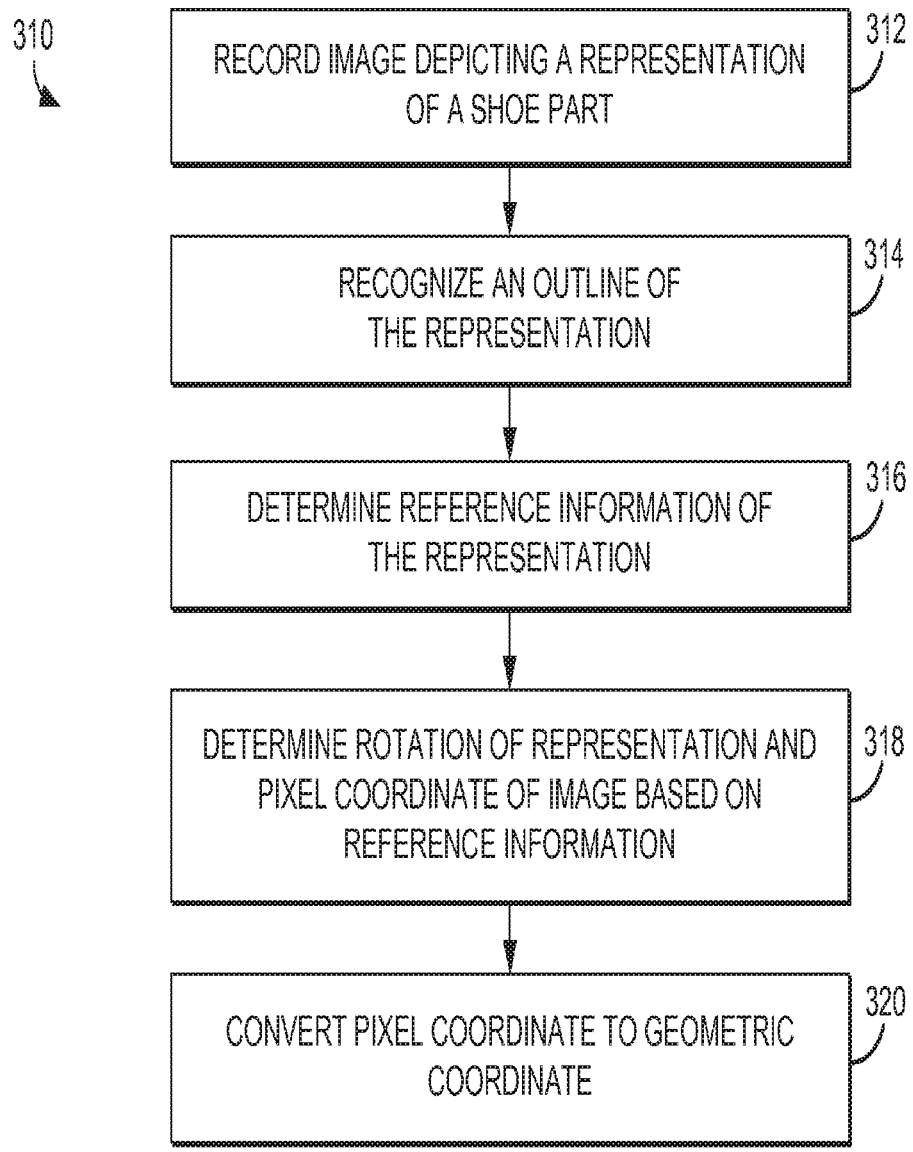
FIG. 3 depicts a flow diagram of a method for analyzing an image of a shoe part.

A part-recognition system may be used in various manners within a shoe manufacturing process. For example, a part-recognition system may be used to execute a method 310 that is outlined in FIG. 3. Method 310 relates to identifying a shoe part and determining an orientation (e.g., geometric position and degree of rotation) of the shoe part. When an identity and orientation of a shoe part is known or determined, the shoe part can be manipulated (e.g., transferred, attached, cut, molded, etc.) in an automated manner. In describing FIG. 3, reference will also be made to FIG. 2 and FIG. 4.

At step 312, an image is recorded that depicts a representation of a shoe part. For example, an image may be recorded by camera 214a or 214b and communicated to an image analyzer 216a or 216b. Exemplary images 228 and 230 are illustrated in image analyzers 216a and 216b (respectively), and each image depicts a two-dimensional ("2-D") representation 232 and 233 of a respective shoe part.

In step 314, an outline or perimeter of the representation as depicted in the image is recognized. For example, once image analyzer 216a acquires image 228, image analyzer 216a recognizes a perimeter or outline of the 2-D representation 232 depicted in image 228. Perimeter or outline recognition may be enhanced using various techniques, such as by providing a background surface that highly contrasts a part depicted in the image, as well as by positioning various environment lighting elements (e.g., full-spectrum light-emitting devices). For example, if a surface of the shoe part that will be captured in the image is grey, a background surface (e.g., surface of a supply station, a part-pickup tool, or an assembly station) may be colored yellow in order to create a contrast in the image between the outline of the part and the background. In one aspect, shoe-part inward-facing surfaces (i.e., a side of the shoe part that may face inward and towards a wearer's foot when assembled into a shoe) and background surface may be manufactured (i.e., intentionally made) to comprise known contrasting colors.

Additional tools may be used to assist with recognizing a perimeter or outline of a representation. For example, system 210 may comprise light-emitting devices 241a and 241b that illuminate the shoe part from various sources. As described with respect to FIG. 1A, light-emitting devices may be arranged in various positions throughout system 210. For example, surface 229 may be illuminated with device 241a or backlit with light 241b, thereby enhancing a contrast between surface 229 and part 224 to render part 224 more recognizable to the 2-D recognition system. That is, if part 224 is illuminated or backlit when image 228 is captured, a better contrast may appear in image 228 between representation 232 and other portions of the image. A full-spectrum light may be used for enhancing part recognition of parts having various colors. Alternatively, a color of the light may be customized based on a color of part 224 and/or the color of supply station and/or assembly station. For example, a red light may be used to enhance a contrast between parts and a supply assembly station that are black or white.

Next, at step 316, image analyzer 216a may determine a plurality of reference features associated with the 2-D representation 232 depicted in image 228. For instance, the reference features may comprise a number of spaced lines and/or points that define the outline or perimeter of the 2-D representation. The spacing between adjacent reference features may be variable. For instance, the spacing between reference features for smaller-sized shoe parts may be less than the spacing between reference features for larger-sized shoe parts to allow for more precision. Each reference feature may be comprised of a variable number of pixels.

An identity of a boundary of the 2-D representation 232 may be recognized using various techniques. For example, shoe-part representation 232 may be compared to various known or model shoe-part references 234-236, which are stored in shoe-part datastore 220 in order to determine the identity of the shoe-part representation 232.

Shoe-part datastore 220 stores information 238, which is shown in an exploded view 240 for illustrative purposes. As an example, exploded view 240 depicts a plurality of known shoe-part references 234-236 that may be used to recognize the identity of the 2-D representation 232. Shoe-part references 234-236 may be associated with pre-determined reference features (e.g., 242 and 244) as outlined above with respect to FIG. 1B, which may be used when assembling a respective shoe part into a shoe. Such reference features may be pre-determined based on various factors, such as a known position of a shoe part among an assembly of shoe parts. For example, when incorporated into a shoe, shoe part 224 is assembled at a position with respect to shoe part 226. As such, this position may be measured and used to instruct shoe-manufacturing equipment on positioning and attachment of shoe part 224.

As depicted in FIG. 2, shoe-part references 234-236 form various 2-D shapes. In an aspect of the invention, the pre-determined reference features may comprise any number of features associated with the perimeter or outline of the shoe-part references 234-236. For example, a reference feature may comprise a specified proportion between different sides of the 2-D shape. As well, a reference feature may comprise a junction point between two adjacent sides of the 2-D shape. Creating pre-determined reference features along a perimeter of the shape can reduce variability that may be created when shoe parts are aligned and connected.

The image analyzer 216a may recognize an identity of the 2-D representation 232 by identifying at least one shoe-part reference of the plurality of shoe-part references 234-236 that substantially matches the 2-D shoe-part representation 232. For example, the image analyzer 216a may recognize the identity of the 2-D shoe-part representation 232 by identifying at least one pre-determined reference feature of a shoe-part reference that substantially matches the at least one reference feature of the 2-D representation 232.

Once a shoe-part representation (e.g., 232) is substantially matched to a known shoe-part reference (e.g., 234), the pre-determined reference feature(s) may be used to analyze an image that depicts the representation. For example, image analyzer 216a has retrieved a recognized entity 249 based on shoe-part reference 234, which was substantially matched to 2-D representation 232. As depicted, recognized entity 249 has a boundary and pre-determined reference feature(s). Accordingly, when the descriptions of FIGS. 1B and 2 are collectively considered, an exemplary method may comprise various steps. For example, model references (e.g., 1012*a* and 1014*a*) and their corresponding pre-determined reference features (e.g., 1021 and 1022) are determined and electronically maintained, such as in datastore 220. A recorded image (e.g., 228 and 230) may then be substantially matched to a model reference by substantially matching reference features of the recorded image with pre-determined reference features of the model. This reference information may be mathematically depicted with respect to a known reference system.

At step 318, a rotation of the representation (as depicted in the image) and pixel coordinates of the image are identified. To illustrate one manner in which image analyzer 216*a* utilizes recognized entity 249 to execute step 318, information 250 is depicted in an exploded view 252. Exploded view 252 depicts image 254 that is identical to image 228. For example, image 254 and image 228 may be the same data, or image 254 may be a copy of image 228. Image 254 is depicted respective to a coordinate system 256, which maps pixels of image 254. Recognized entity 249 is applied to image 254, such as by substantially centering image 254 within the boundaries of recognized entity 249 and aligning by reference feature(s) 258. As such, pixel coordinates of image 254 can be determined that belong to coordinate system 252. In addition, a degree of rotation (i.e., Θ) of the shoe-part representation (as depicted in image 254) is determined by measuring an angle between reference lines 260 and 262.

The pixel coordinates and degree of rotation that are extracted from the image may be used to instruct part-transfer apparatus 212. That is, image 228 may be recorded by camera 214*a* when shoe part 224 is oriented (i.e., positioned and rotated) somewhere in the 3-D space in which part-transfer apparatus 212 operates. Examples of positions at which shoe part 224 may be located include a part supply station, an assembly station, and/or held by part-transfer apparatus 212. Accordingly, when certain inputs are provided, pixel coordinates of image 228 may be converted by dimension converter 218 to a geometric coordinate 205 of the system represented by grid 225. Accordingly, in step 320 of method 310 the pixel coordinates may be converted to a geometric coordinate.

Figure 4:
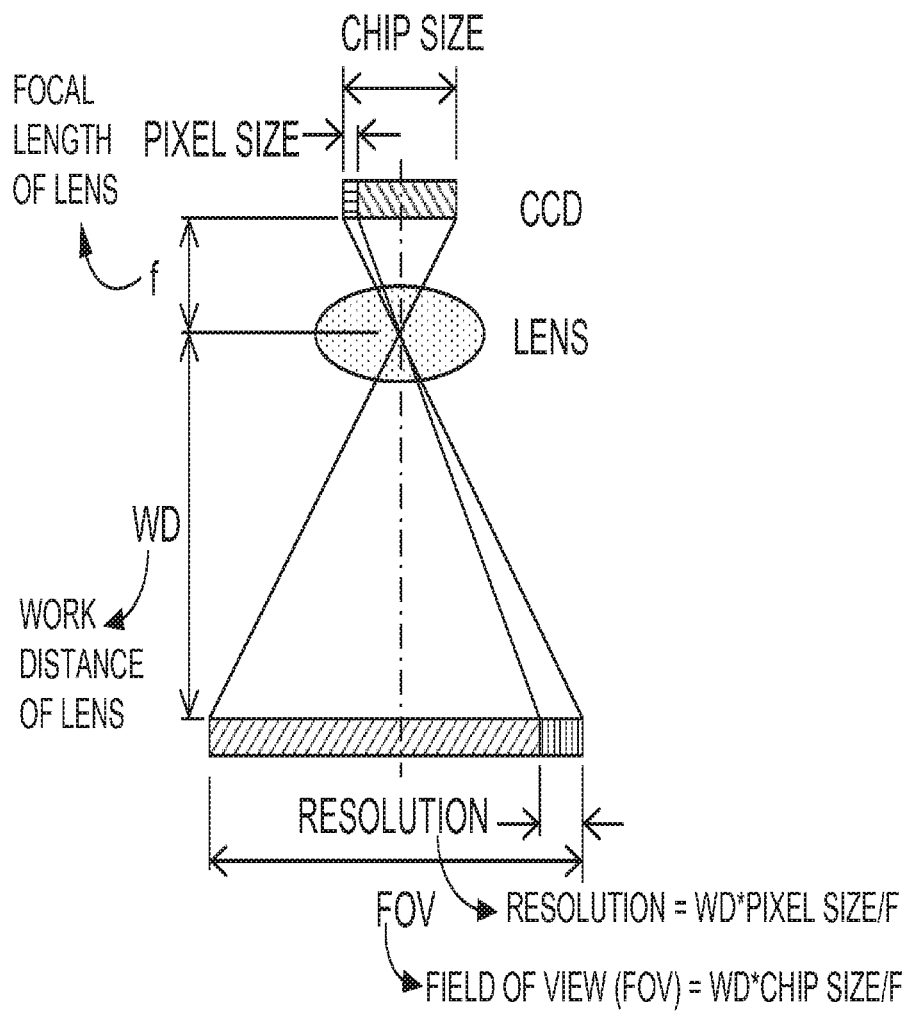
FIG. 4 depicts a schematic diagram of an exemplary image-recording system.

Inputs utilized by dimension converter 218 may comprise measurement values describing system 210, camera 214*a*, and part-transfer apparatus 212. Examples of such measurement values are relative positions (i.e., zero positions) of camera 214*a* and of part-transfer apparatus 212; a number of pixels of the X and Y coordinates of system 256; a distance between camera 214*a* and part 224; a chip size of the CCD in camera 214*a*; a lens focal length; a field of view; a pixel size; and a resolution per pixel. These inputs may vary depending on the capabilities of the equipment used in system 210 and some inputs may have a direct bearing on where equipment may be positioned within system 210. For example, the strength of camera 214*a* may have a bearing on where part 224 should be positioned (relative to camera 214*a*) when camera 214*a* will record an image of part 224. To further illustrate a relationship between various inputs used to convert a pixel coordinate to a geometric coordinate, FIG. 4 depicts a schematic diagram of a system with which an image may be recorded and analyzed.

The geometric coordinate generated by dimension converter 218 can be used to report a position of shoe part 224 to part-transfer apparatus 212. Moreover, the degree of rotation can be used to determine to what extent shoe part 224 may need to be rotated by part-transfer apparatus 212 in order to be properly aligned for subsequent manipulation (e.g., attachment to another shoe part, cutting, painting, etc.). Accordingly, part-transfer apparatus 212 may comprise a part-pickup tool that enables part-transfer apparatus 212 to acquire part 224 from a part-supply area and hold part 224 while transferring part 224 to a new location. For example, part-transfer apparatus 224 may use a gripping structure, suction, electromagnetic forces, surface tack, or any other methodology to temporarily engage and move a shoe part.

Although the above 2-D recognition process is described by referencing shoe part 224 and image 228, a similar analysis may be used to identify shoe part 226 and determine its orientation, thereby enabling part-transfer apparatus 212 to account for part 226 when manipulating part 224. That is, information 270 is depicted in image analyzer 216*b* and is shown in an exploded view 272 for illustrative purposes. Exploded view 272 conveys that image 230 may be analyzed similar to image 228 to determine an orientation (i.e., geometric coordinate and degree of rotation) of part 226 based on reference feature(s) 279 and theta. Any number of shoe parts may be identified and/or positioned, either simultaneously or sequentially in accordance with the present invention.

Once respective geometric coordinates of part 224 and part 226 are known, part-transfer apparatus 212 can pick up part 224 and move part 224 to a part-position coordinate 203 that is relative to the geometric coordinate of part 226. For example, FIG. 2 depicts multiple broken-line views of part-transfer apparatus 212 to illustrate a movement of part-transfer apparatus and a transfer of part 224. A part-position coordinate 203 refers to a coordinate in the geometric coordinate system (e.g., the system illustrated by grid 225) to which an attachment part (e.g., part 224) is transferred in order to be attached to a base part (e.g., part 226). For example, part-transfer apparatus 212 may transfer part 224 to geometric coordinate 203 to be attached to part 226.

A part-position coordinate 203 may be determined in various ways. For example, part 226 may be a base shoe part onto which part 224 is attached, such that a position of part 224 respective to part 226 (when the parts are assembled) is known. As such, the known position may be determined by retrieving a stored reference feature, which was pre-determined using a method similar to that described with respect to FIG. 1B. However, this position that is known may still be converted to a coordinate that is recognized by part-transfer apparatus 212 when part 226 has been positioned within a coordinate system of part-transfer apparatus 212. That is, outside of coordinate system 225, a position relative to part 226 at which part 224 is arranged is known, and is identified by reference numeral 277 in datastore 220. This position is also identified in exploded view 272 in which the position is identified as "part-position location for part 224." When an orientation of part 226 is determined, such as by executing method 310, the point 277 (also depicted in exploded view 272) that is respective to part 226 at which part 224 is arranged can be converted to a geometric coordinate 203 within system 225, thereby calculating part-position coordinate 203. Accordingly, in an exemplary aspect, part-position 203 is converted to a geometric coordinate based in part on reference feature 1022, which was described with reference to FIG. 1B.

In a further aspect, once part-position point 203 is determined, part 224 can be transferred to the part-position coordinate 203 based on the reference information determined with respect to part 224 (e.g., 1021 in FIG. 1B). For example, pixel coordinates and orientation may be derived from image 228 (as described above) and may be converted to a geometric coordinate (e.g., 205). Calculations may then be made to transfer part 224 to point 203. For example, a virtual robot end effector may be created based on the geometric data (e.g., 203 and 205) and may be moved from point 205 to point 203. While these steps are depicted graphically in FIG. 2 for illustrative purposes, these steps could also be executed mathematically by solving sequential conversion algorithms.

Accordingly, the above-described recognition process (e.g., method 310) may be used in many different scenarios within a shoe-manufacturing process. For example, once shoe part 224 has been positioned respective to shoe part 226, shoe part 224 can be attached to shoe part 226, such as by stitching, adhering, and/or sonic welding. As such, in order to enable automation, a geometric coordinate 201 of the attachment point is also determined. That is, once geometric coordinates of parts 224 and 226 are known within coordinate system 225, geometric coordinates of attachment locations can also be calculated.

An attachment-point coordinate 201 may be determined in various ways. For example, part 226 may be a base shoe part onto part 224 is attached. As such, a point of attachment onto base shoe part is known, but it still may be converted to a coordinate that is recognized by part-transfer apparatus 212. That is, outside of coordinate system 225, a point on part 226 at which part 224 will be attached is known, and is identified by reference numeral 274 in datastore 220. When an orientation of part 226 is determined, such as by executing method 310, the point 274 (also depicted in exploded view 272) on part 226 at which part 224 is attached can be converted to a geometric coordinate 201 within system 225. As such, an attachment process can be executed at the geometric coordinate 201. As indicated above, although these steps are depicted graphically in FIG. 2 for illustrative purposes, these steps could also be executed mathematically by solving sequential conversion algorithms.

In one aspect, part-transfer tool 212 also may have an attachment device, which operates to attach part 224 to part 226. Exemplary attachment devices are an ultrasonic welder, heat press, stitching apparatus, or a device that accomplishes a respective method of attachment.

The components of system 210 may be arranged in various configurations to accomplish a wide range of shoe-manufacturing processes. In addition, there may be additional components arranged into a series of stations. For example, system 210 may be comprised of cameras in addition to cameras 214a-b, as well as additional part-transfer apparatuses. Different types of cameras and/or part transfer apparatuses may be combined in accordance with the present invention. These additional tools may be arranged at different positions along conveyor 222 to allow additional parts to be added (e.g., added to the assembly of parts 224 and 226) and to allow additional shoe-part manipulation.

Moreover, the cameras of system 210 may be arranged at different positions with respect to a shoe part. For example, as depicted in FIG. 1A, cameras may be positioned above a shoe part, below a shoe part, horizontal to a shoe part, or at an angle away from a shoe part, so long as the camera position allows the geometric coordinate of the part to be calculated. One such camera position may be perpendicular to (i.e., normal to) a viewing plane. However, the camera could be positioned at an angle from the viewing plane, so long as the angle is provided as an input to the system when converting the representation orientation to a geometric coordinate. Accordingly, system 210 may be incorporated into larger shoe-manufacturing processes.

A 2-D recognition system may be used at an initial stage to enable part-transfer apparatus 212 to position a base shoe part onto a conveyor or other part-moving apparatus. A base shoe part refers to a shoe part onto which one or more other shoe parts may be attached, and a base shoe part may be constructed of a single part or a plurality of parts that have been assembled. Accordingly, part 226 may be deemed a base shoe part onto which part 224 is attached. Parts transferred may also be foams, mesh, and/or adhesive layers, such as TPU films, ultimately used to join other parts together. Further, component parts previously affixed to one another in accordance with the present invention may be treated as a single part for subsequent identification transfer, etc.

Figure 5:
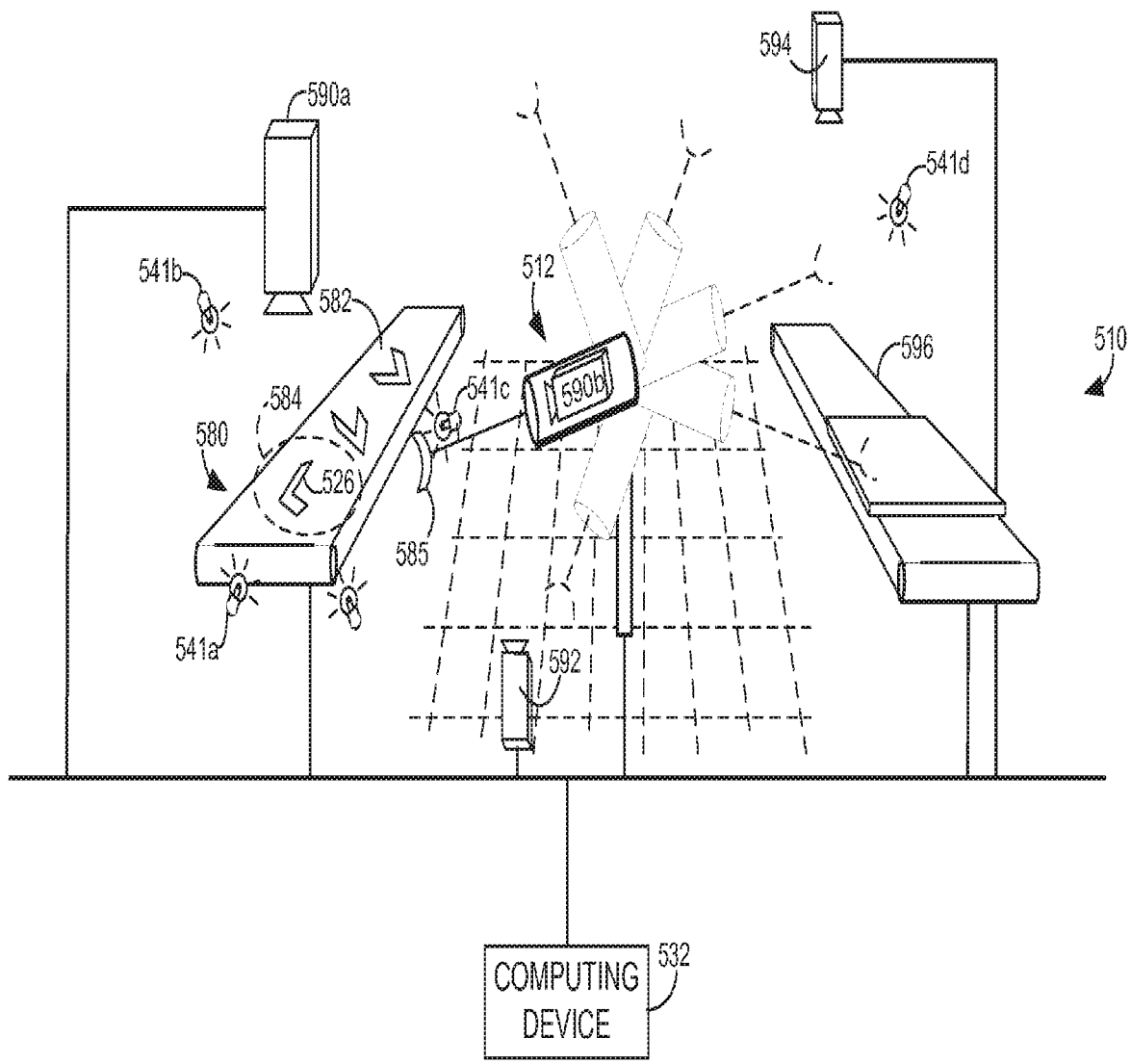
FIGS. 5 and 6 depict a respective schematic diagram of an exemplary system for carrying out shoe-manufacturing methods.

Referring to FIG. 5, a system 510 is depicted in which a 2-D part-recognition system may be used at an initial manufacturing stage, such as when the base shoe part 526 is initially stored at a part-supply station 580, which may be comprised of various configurations. For example, a part-supply station 580 may comprise a set of stacked base shoe parts from which part-transfer apparatus 512 acquires a topmost base shoe part. Alternatively, the part-supply station may have a conveyor 582 that transfers the base shoe part to a pickup location 584 at which part-transfer apparatus 512 acquires the base shoe part. As previously described, part-transfer apparatus 512 may have a part-pickup tool 585.

Prior to transferring base shoe part 526 to conveyor 596, a camera may record an image of the base shoe part 526 to allow part-transfer apparatus 512 to determine a geometric position and rotation of the base shoe part 526. For example, a camera may record an image of the base shoe part 526 when the base shoe part 526 is next-in-line to be acquired by part-transfer apparatus 512—i.e., immediately prior to the base shoe part 526 being acquired by part-transfer apparatus 512 and when the base shoe part 526 is at pickup location 584. The camera may be an above-mounted camera 590a-b that is mounted above, and perpendicular to, the base shoe part 526. As depicted in FIG. 5, an above-mounted camera 590a-b may be mounted either apart from (e.g., 590a) or onto (e.g., 590b) part-transfer apparatus 512.

Although part-transfer apparatus 512 is illustrated to have a certain configuration depicted in FIG. 5, part-transfer apparatus may have a different configuration, such as the configuration depicted in FIG. 1A, in which a camera mounted to the part-transfer apparatus may be positionable directly above and perpendicular to base shoe part 526. Part-transfer apparatus 512 may also comprise a plurality of articulating arms that enable movement of a camera (or an acquired shoe part) to a desired angle or position.

Moreover, if the image is recorded while the base shoe part 526 is at a part-supply station (i.e., at location 584), a light-emitting device may be arranged at various positions throughout system 510. For example, a light-emitting device 541a may be positioned adjacent to or incorporated into the part-supply station 580 to provide a backlight to the base shoe part 526. Also, a light-emitting device 541b may be positioned in a space that surrounds base shoe part, such that the light-emitting device 541b illuminates base shoe part 526 from a front side.

Alternatively, part-transfer apparatus 512 may acquire base shoe part 526 before an image is recorded and position the acquired base shoe part in front of a camera. For example, a below-mounted camera 592 may be secured near a floor surface, and part-transfer apparatus 512 may position the acquired base shoe part directly above, and perpendicular to, the below-mounted camera 512. Alternatively, part-transfer apparatus 512 may position the acquired base shoe part directly below, and perpendicular to, above-mounted cameras 590a or 594. As described above, although part-transfer apparatus 512 is illustrated to have a certain configuration depicted in FIG. 5, part-transfer apparatus may have a different configuration. For example, part-transfer apparatus 512 may have the configuration depicted in FIG. 1A. In addition, part-transfer apparatus may be comprised of a plurality of articulating arms.

If the image is recorded after the base shoe part 526 has been acquired by part-transfer apparatus, a light-emitting device 541c may be arranged at various positions. For example, a light-emitting device 541c may be incorporated into the part-transfer apparatus 512, such as behind (or incorporated into) the part-pickup tool 585, thereby providing a backlight to base shoe part 526. In addition, other light-emitting devices (e.g., 541d) positions throughout system 510 may illuminate a front side of a base shoe part that is acquired by part-transfer apparatus 512

Once an image has been recorded, a geometric position and rotation of the base shoe part may be determined using the previously described methods (e.g., method 310). The geometric position and rotation may then be used to determine a position of the base shoe part when the base shoe part is transferred to conveyor 596. For example, part-transfer apparatus 512 may execute a predetermined movement path each time it transfers base shoe part 526 from a part-supply station 580, or from in front of a camera (e.g., 590a, 592, or 594), to conveyor 596. As such, once the geometric position and rotation of the base shoe part are known, the part-transfer apparatus may determine where the base shoe part will be positioned when the predetermined movement path is executed. Alternatively, a geometric position on conveyor 596 may be predetermined, such that part-transfer apparatus 512 (or some computing device associated therewith) calculates a new movement path each time. That is, the new movement path extends from the calculated position of the base shoe part 526 (when the image is recorded) to the predetermined position on the conveyor 596. Computing device 532 may help execute various operations, such as by analyzing images and providing instructions to shoe-manufacturing equipment.

In another aspect, a 2-D recognition system may be used when base shoe part 526 has already been transferred to conveyor 596 in order to determine a geometric position and rotation of base shoe part 526 as it is arranged on conveyor 596. As such, conveyor 596 may move base shoe part along an assembly line and to a position that is beneath an above-mounted camera (e.g., 594). Once an image has been recorded by the above-mounted camera and a position of base shoe part has been determined, other shoe parts may be transferred and attached to the base shoe part.

As such, in a further aspect, a 2-D recognition system may be used after the initial stage to enable a part-transfer apparatus to position an attachment shoe part. An attachment shoe part refers to a shoe part that is to be attached to a base shoe part. Accordingly, in FIG. 2 part 224 may be deemed an attachment shoe part that is to be attached to shoe part 226.

Figure 6:
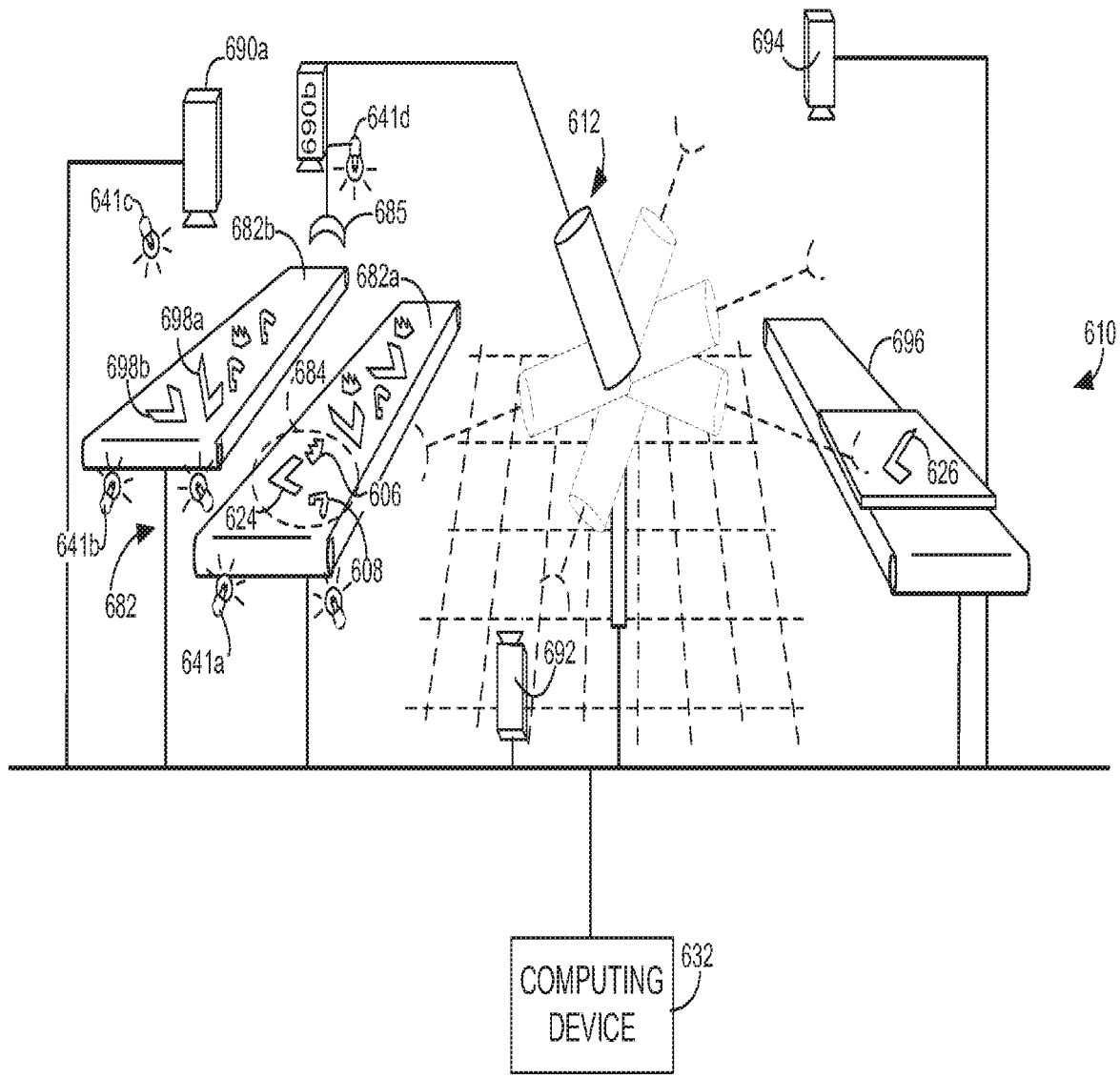

Referring to FIG. 6, a system 610 is depicted in which a 2-D recognition system may be used to position an attachment part 624, such as when the attachment shoe part 624 is initially stored at a part-supply station 682, which may be arranged into various configurations. As previously described, a part-supply station 682 may comprise a set of stacked shoe parts from which part-transfer apparatus 612 acquires a topmost attachment shoe part. Alternatively, the part-supply station 682 may be comprised of a set of conveyors 682a and 682b, one of which transfers the attachment shoe part 624 to a pickup location 684 at which part-transfer apparatus 612 may acquire the attachment shoe part 624.

As previously described, part-transfer apparatus 612 may have a part-pickup tool 685. Although part-transfer apparatus 612 is illustrated to have a certain configuration depicted in FIG. 6, part-transfer apparatus may have a different configuration, such as the configuration depicted in FIG. 1A, or a configuration comprising a plurality of articulating arms that enable movement of a camera (or an acquired shoe part) to a desired angle or position.

The attachment shoe part 624 may be provided at the supply station 682 among a plurality of different attachment shoe parts (e.g., 606 and 608), each of which may be attached to a respective portion of base shoe part 626. As such, 2-D recognition system may execute a part-selection protocol, which allows the system to identify and select a desired attachment part.

In an exemplary part-selection protocol, the 2-D recognition system may be programmed to follow a predetermined order of attachment parts—i.e., attach first part 624, followed by second part 608, followed by third part 606, etc. Accordingly, the 2-D recognition system may record images of all of the parts arranged among the plurality, identify each part (e.g., based on datastore 220), and determine a geometric location of each part as it is positioned at supply station 682. Once this position information has been determined by the 2-D recognition system, part-transfer apparatus 612 may acquire and attach each part in the predetermined order.

In another part-selection protocol, the 2-D recognition system may be programmed to transfer and attach a set of parts, regardless of the order—i.e., attach first, second, and third parts in any order. Accordingly, once images of each part (e.g., 606, 608, and 624) have been analyzed to determine a geometric position, part-transfer apparatus 612 may acquire the parts in a variety of orders, as long as all of the parts are transferred to the base part 626 at some point. Moreover, the 2-D recognition system may be programmed to retrieve the parts that are positioned in a manner that allows for the most efficient transfer from the supply station 682 to base shoe part 626. For example, if two first parts 698a and 698b are provided at the supply station and one of the first parts 698a is closer than the other first part 698b (based on respective geometric coordinates), the part-transfer apparatus 612 may be instructed to pick up the closer first part 698a instead of the other first part 698b. Similarly, if a first part 698a is rotated to a degree that may need less adjustment (relative to another first part 698b) in order to be attached to base part 626, the part-transfer apparatus 612 may be instructed to pick up the first part 698a. Computing device 632 may help execute various operations, such as by executing certain steps in a part-selection protocol, analyzing images, and providing instructions to shoe-manufacturing equipment.

In another exemplary aspect, parts 606, 608, and 624 may be arranged at part-pickup location 684 in a pre-determined configuration, such that coordinates of the pre-determined configuration may be provided to apparatus 612 to assist with part selection. That is, if a coordinate of each part 606, 608, and 624 is pre-determined based on how the group of parts are to be arranged (prior to being picked up), then a coordinate may not have to be calculated based on images. Or, a pre-determined coordinate may be used as a check to confirm that a calculated coordinate is accurate (e.g., within a threshold amount away from the pre-determined coordinate).

In a further aspect, a pre-determined arrangement of parts 606, 608, and 624 at part-pickup location 684 may match an arrangement of the parts 606, 608, and 624 when the parts are attached to base part 626. That is, each of parts 606, 608, and 624 may be spaced apart from one another and rotated in a manner that matches a spacing and rotation of each part when attached to base part 626. As such, parts 606, 608, and 624 may be picked up, placed, and/or attached as a collective group (i.e., more than one at a time) in a manner that maintains the pre-determined arrangement (i.e., maintains the spacing and rotation).

When an image is recorded of an attachment shoe part 624 to determine an orientation of the attachment shoe part 624, the camera may be positioned in various locations. As previously described, if the attachment shoe part 624 is positioned at the supply station 682 when the image is captured, the camera (e.g., 690b) may be coupled directly to part-transfer apparatus 612, or may be an above-mounted camera 690a. Camera 690b or 690a may be perpendicularly oriented from shoe part 624 when the image is recorded. For example, part-transfer apparatus 612 may be comprised of one or more articulating arms that position camera 690b above and perpendicular to shoe part 624.

Moreover, light-emitting devices may be arranged throughout system 610 to illuminate shoe part 624 when positioned at part-supply station 682. For example, a light-emitting device 641a or 641b may be positioned adjacent to, or integrated into, the supply station 682 in order to backlight the attachment shoe parts positioned on conveyors 682a and 682b. Also, light-emitting devices 641c may be positioned in a space surrounding part-supply station 682 to illuminate a front side of shoe part 624.

If the attachment shoe part 624 is retained by part-transfer apparatus 612 when the image is captured, the camera may be mounted remotely from the part-transfer apparatus 612, such as camera 690a, 692, or 694. In such an arrangement, shoe-transfer apparatus 612 may position the attachment shoe part in front of (e.g., perpendicular to a field of view of) camera 690a, 692, or 694. Moreover, a light-emitting device 641d may be integrated into the part-transfer apparatus 612, such as behind the part-pickup tool 685, in order to illuminate the acquired shoe parts when the image is captured.

Although some of the above methods describe analyzing a single image to determine an orientation, multiple images of a single part, which are recorded by one or more cameras, may be analyzed to derive a set of geometric coordinates that are believed to accurately represent a position of a shoe part. In such a system, the set of geometric coordinates may be averaged or otherwise combined to arrive at a final geometric coordinate.

Figure 7:
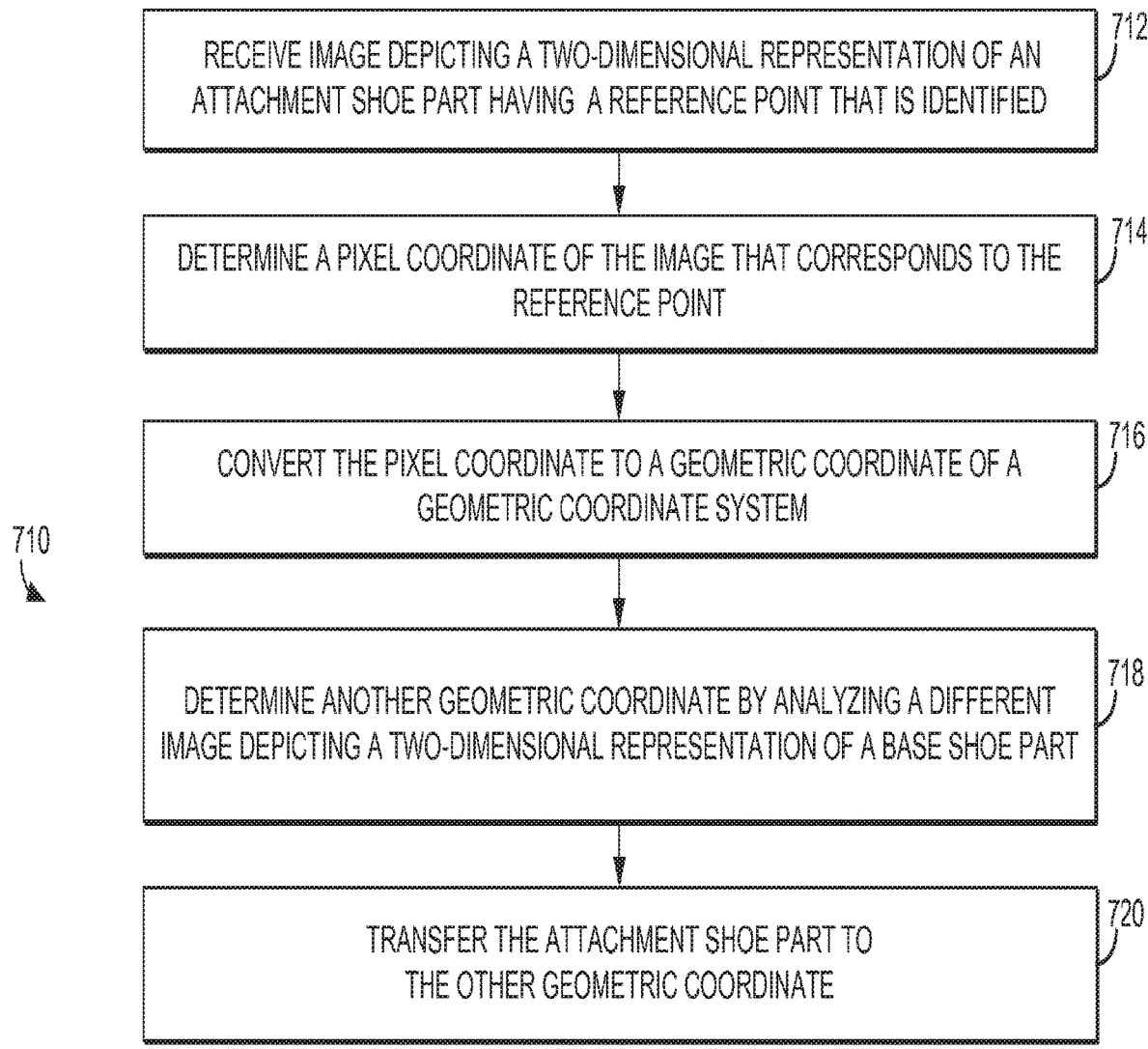
FIGS. 7 and 8 depict a respective flow diagram of a method for analyzing an image of a shoe part.

Referring now to FIG. 7, a flow diagram is depicted of a method 710 for positioning a shoe part in an automated manner during a shoe-manufacturing process. In describing FIG. 7, reference is also be made to FIG. 2. In addition, method 710, or at least a portion thereof, may be carried out when a computing device executes a set of computer-executable instructions stored on computer storage media.

At step 712 an image (e.g., 228) may be received depicting a two-dimensional representation (e.g., 232) of an attachment shoe part (e.g., 224), which is to be attached to a base shoe part (e.g., 226), wherein the two-dimensional representation of the attachment shoe part comprises a plurality of reference features 258. At step 714, pixel coordinates of the image (e.g., coordinate of system 256) are identified that correspond to the reference features. Step 716 converts the pixel coordinates of the image to a geometric coordinate (e.g., 205) of a geometric coordinate system (e.g., 225), which maps a three-dimensional space within which the attachment shoe part (e.g., 224) is positioned and a part-transfer apparatus (e.g., 212) operates. Further, at step 718, another geometric coordinate (e.g., 203) of the geometric coordinate system (e.g., 225) is determined by analyzing a different image (e.g., 230) depicting a two-dimensional representation (e.g., 233) of the base shoe part (e.g., 226) to which the attachment shoe part (e.g., 224) will be attached. Step 720 transfers, by the part-transfer apparatus (e.g., 212), the attachment shoe part (e.g., 224) to the other geometric coordinate (e.g., 203), thereby moving the attachment shoe part to a location in the three-dimensional space at which the attachment shoe part is to be attached to the base shoe part.

Figure 8:
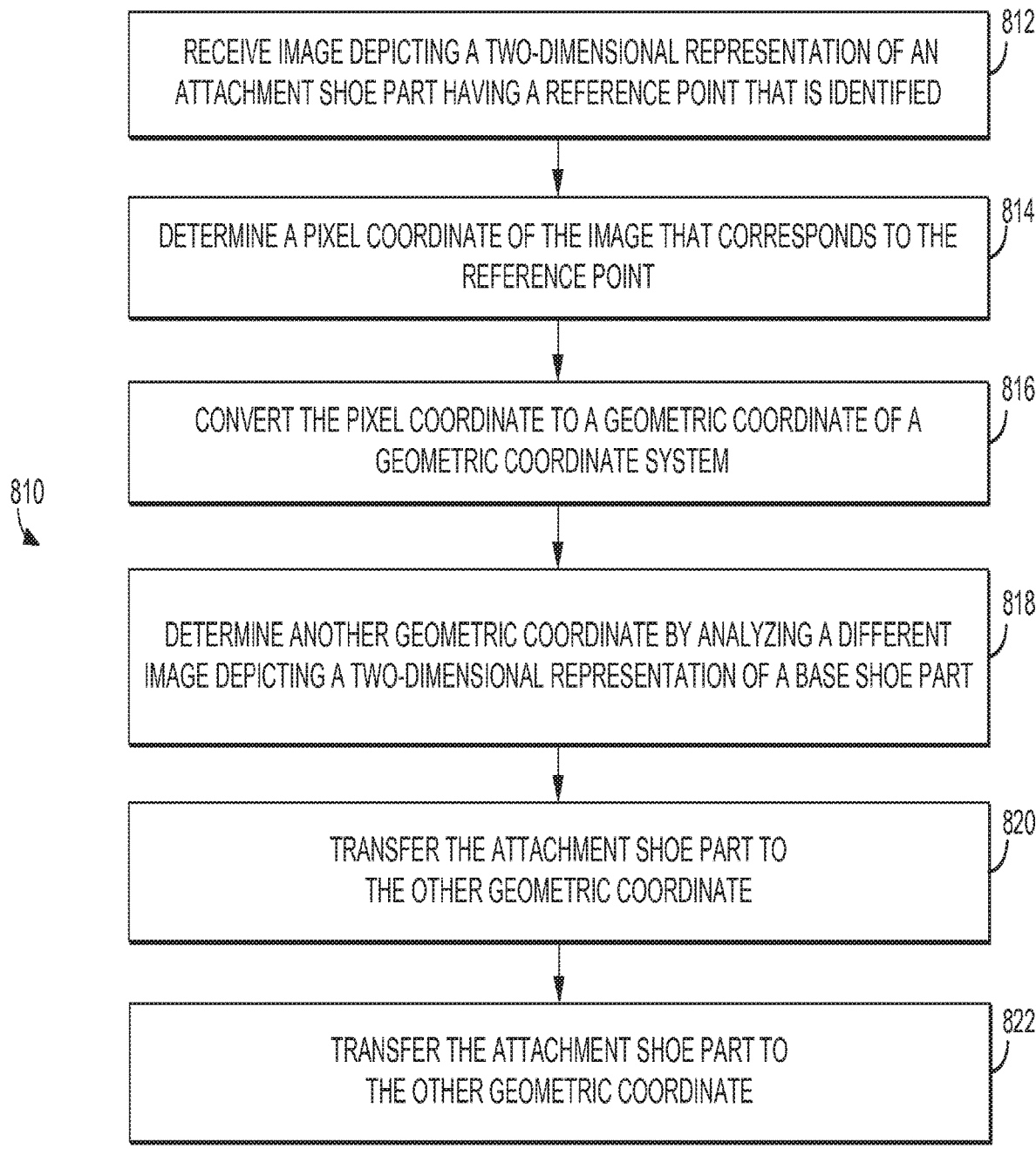

Referring now to FIG. 8, another flow diagram is depicted of a method 810 for positioning a shoe part in an automated manner during a shoe-manufacturing process. In describing FIG. 8, reference is also be made to FIG. 2. In addition, method 810, or at least a portion thereof, may be carried out when a computing device executes a set of computer-executable instructions stored on computer storage media.

At step 812 an image (e.g., 228) is received depicting a two-dimensional representation (e.g., 232) of an attachment shoe part (e.g., 224), which is to be attached to a base shoe part (e.g., 226), wherein the two-dimensional representation of the attachment shoe part comprises at least one reference feature 258. At step 814, pixel coordinates of the image (e.g., coordinate of system 256) are identified that correspond to the at least one reference feature 258. Step 816 converts the pixel coordinates of the image to a geometric coordinate (e.g., 205) of a geometric coordinate system (e.g., 225), which maps a three-dimensional space within which the attachment shoe part (e.g., 224) is positioned and a part-transfer apparatus (e.g., 212) operates. Furthermore, step 818 determines a plurality of other geometric coordinates (e.g., 203 and 202) in the geometric coordinate system by analyzing a different image (e.g., 230) depicting a two-dimensional representation (e.g., 233) of the base shoe part (e.g., 226) to which the attachment shoe part (e.g., 224) will be attached. The plurality of other geometric coordinates may comprise a part-position coordinate (e.g., 203) and a part-attachment coordinate (e.g., 201). Step 820 transfers, by the part-transfer apparatus, the attachment shoe part (e.g., 224) to the part-position coordinate (e.g., 203), and step 822 attaches the attachment shoe part to the base part at the part-attachment coordinate (e.g., 201).

The 2-D recognition system described above may also be used for quality control purposes. For instance, the 2-D recognition system may allow for detection of a mismatched attachment part in a set of matching stacked attachment parts. Further, the 2-D recognition system may also enable quality control of shoe-part positioning to ensure position placement accuracy.

Figure 9:
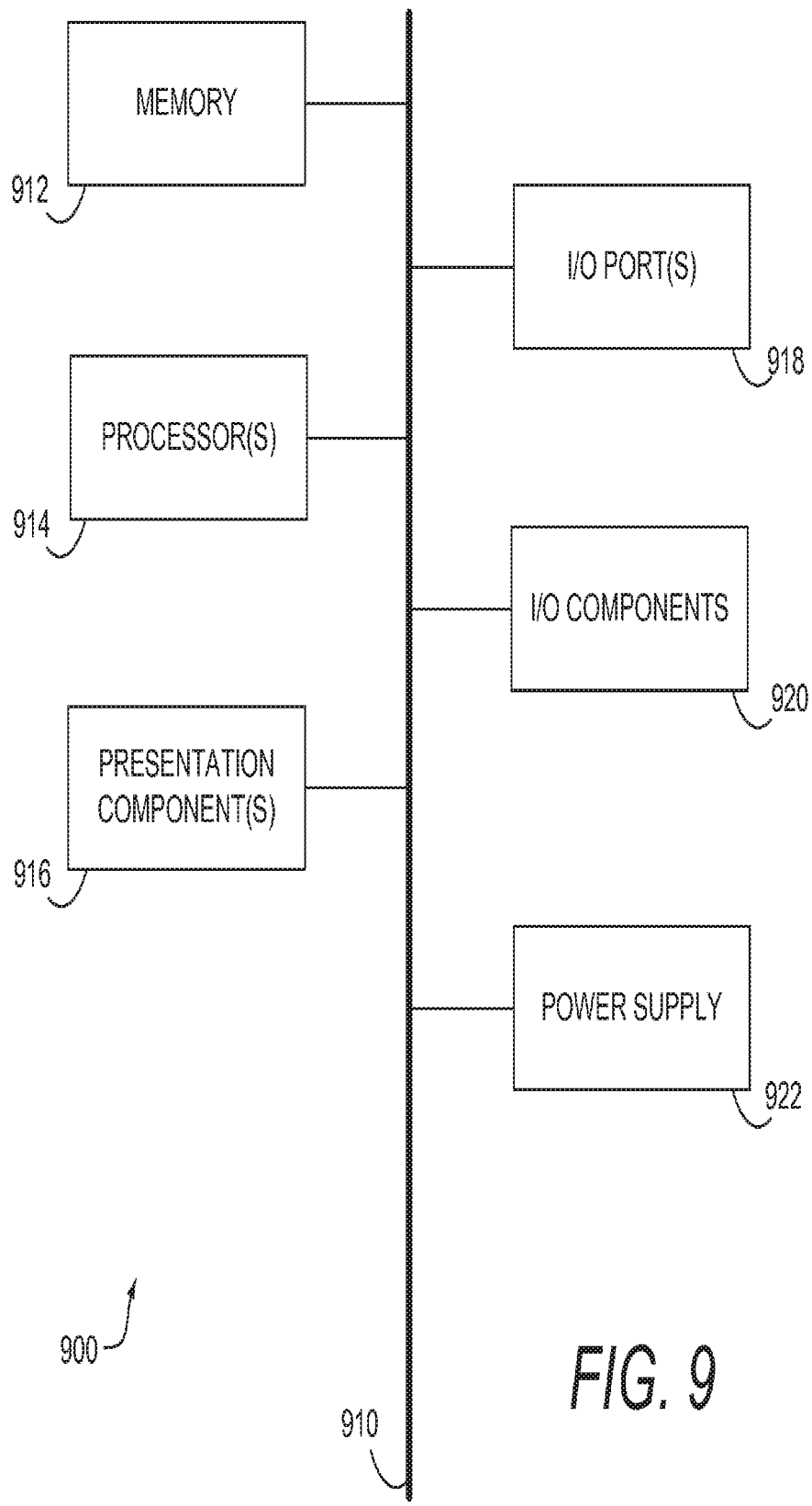
FIG. 9 depicts a block diagram of an exemplary computing device that may be used with systems and methods in accordance with the present invention.

As described above, our technology may comprise, among other things, a method, a system, or a set of instructions stored on one or more computer-readable media. Information stored on the computer-readable media may be used to direct operations of a computing device, and an exemplary computing device 900 is depicted in FIG. 9. Computing device 900 is but one example of a suitable computing system and is not intended to suggest any limitation as to the scope of use or functionality of invention aspects. Neither should the computing system 900 be interpreted as having any dependency or requirement relating to any one or combination of components illustrated. Moreover, aspects of the invention may also be practiced in distributed computing systems where tasks are performed by separate or remote-processing devices that are linked through a communications network.

Computing device 900 has a bus 910 that directly or indirectly couples the following components: memory 912, one or more processors 914, one or more presentation components 916, input/output ports 918, input/output components 920, and an illustrative power supply 922. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, processors may have memory.

Computing device 900 typically may have a variety of computer-readable media. By way of example, and not limitation, computer-readable media may comprises Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 900.

Memory 912 is comprised of tangible computer-storage media in the form of volatile and/or nonvolatile memory. Memory 912 may be removable, nonremovable, or a combination thereof. Exemplary hardware devices are solid-state memory, hard drives, optical-disc drives, etc.

Computing device 900 is depicted to have one or more processors 914 that read data from various entities such as memory 912 or I/O components 920. Exemplary data that is read by a processor may be comprised of computer code or machine-useable instructions, which may be computer-executable instructions such as program modules, being executed by a computer or other machine. Generally, program modules such as routines, programs, objects, components, data structures, etc., refer to code that perform particular tasks or implement particular abstract data types.

Presentation component(s) 916 present data indications to a user or other device. Exemplary presentation components are a display device, speaker, printing component, light-emitting component, etc. I/O ports 918 allow computing device 900 to be logically coupled to other devices including I/O components 920, some of which may be built in.

In the context of shoe manufacturing, a computing device 900 may be used to determine operations of various shoe-manufacturing tools. For example, a computing device may be used to control a part-pickup tool or a conveyor that transfers shoe parts from one location to another. In addition, a computing device may be used to control a part-attachment device that attaches (e.g., welds, adheres, stitches, etc.) one shoe part to another shoe part.

Many different arrangements of the various components depicted, as well as components not shown, are possible without departing from the scope of the claims below. Aspects of our technology have been described with the intent to be illustrative rather than restrictive. Alternative aspects will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A method for positioning and aligning shoe parts in an automated manner during a shoe-manufacturing process, the method comprising:
    recording a first image of an attachment shoe part using at least one camera, the first image depicting a two-dimensional representation of the attachment shoe part;
    recording a second image of a base shoe part using the at least one camera, the second image depicting a two-dimensional representation of the base shoe part;
    identifying at least one reference feature of the attachment shoe part in the first image depicting the two-dimensional representation of the attachment shoe part;
    determining an identity of the attachment shoe part by comparing the at least one reference feature identified in the first image to at least one pre-determined reference feature of a shoe-part reference image;
    determining, from the first image, a first geometric coordinate of the attachment shoe part in a geometric coordinate system;
    determining, from the second image, a second geometric coordinate of the base shoe part in the geometric coordinate system;
    communicating the first and the second geometric coordinates to a part-transfer apparatus which operates in the geometric coordinate system; and
    transferring, by the part-transfer apparatus, the attachment shoe part from the first geometric coordinate to the second geometric coordinate to align the attachment shoe part with the base shoe part for attachment in the shoe-manufacturing process.

2. The method of claim 1, further comprising attaching the aligned attachment shoe part to the base shoe part at the second geometric coordinate using a part-attachment device.

3. The method of claim 1, further comprising determining an orientation of the attachment shoe part from the at least one reference feature of the first image.

4. The method of claim 3, further comprising determining, from the first image and the second image, a degree of rotation of the attachment shoe part required for alignment with the base shoe part, the degree of rotation determined based at least on the orientation of the attachment shoe part obtained from the first image and an orientation of the base shoe part obtained from the second image.

5. The method of claim 4, wherein transferring, by the part-transfer apparatus, the attachment shoe part from the first geometric coordinate to the second geometric coordinate comprises transferring the attachment shoe part through the degree of rotation so that the attachment shoe part is aligned with the base shoe part for attachment.

6. The method of claim 1, wherein when the first image is recorded, the attachment shoe part is either:
    held by the part-transfer apparatus; or
    maintained at a supply station from which the attachment shoe part is acquired by the part-transfer apparatus.

7. The method of claim 1, wherein the two-dimensional representation of the attachment shoe part is comprised of a two-dimensional shape having a perimeter, and wherein the at least one reference feature of the two-dimensional representation of the attachment shoe part is associated with the perimeter.

8. The method of claim 1, further comprising:
determining pixel coordinates of the first image that correspond to the at least one pre-determined reference feature; and
converting, by a computer processor, the pixel coordinates of the first image to the first geometric coordinate, wherein the shoe-part reference image is stored in a datastore, and wherein the datastore stores a plurality of shoe-part reference images.

9. The method of claim 1, wherein the part-transfer apparatus utilizes at least one of a gripping structure, suction, electromagnetic forces, and surface tack.

10. A system that positions and aligns shoe parts in an automated manner during a shoe-manufacturing process, the system comprising:
at least one image recorder that records a first image of an attachment shoe part and a second image of a base shoe part, the first image depicting a two-dimensional representation of the attachment shoe part and the second image depicting a two-dimensional representation of the base shoe part;
computer storage media having stored thereon computer-executable instructions that, when executed, cause a computing device to:
identify at least one reference feature of the two-dimensional representation of the attachment shoe part,
determine an identity of the attachment shoe part by comparing the at least one reference feature of the attachment shoe part to at least one predetermined reference feature of a shoe-part reference image,
determine, by analyzing the first image, a first geometric coordinate of the attachment shoe part in a geometric coordinate system, and
determine, by analyzing the second image, a second geometric coordinate of the base shoe part in the geometric coordinate system; and
a part-transfer apparatus, which operates in the geometric coordinate system, that is configured to:
receive the first geometric coordinate and the second geometric coordinate, and
transfer the attachment shoe part from the first geometric coordinate to the second geometric coordinate so that the attachment shoe part is aligned with the base shoe part for attachment in the shoe-manufacturing process.

11. The system of claim 10, wherein the at least one image recorder comprises a first image recorder that records the first image and a second image recorder that records the second image.

12. The system of claim 10, wherein, when the first image is recorded, the attachment shoe part is either:
provided at a part-supply apparatus; or
held by the part-transfer apparatus.

13. The system of claim 10, further comprising a light-emitting device that provides a backlight to the attachment shoe part when the first image is recorded.

14. A method for positioning and aligning shoe parts in an automated manner during a shoe-manufacturing process, the method comprising:
positioning an attachment shoe part and a base shoe part;
recording a first image of the attachment shoe part using at least one camera, the first image depicting a two-dimensional representation of the attachment shoe part;
recording a second image of the base shoe part using the at least one camera, the second image depicting a two-dimensional representation of the base shoe part;
identifying at least one reference feature of the attachment shoe part in the two-dimensional representation of the attachment shoe part;
determining an identity of the attachment shoe part by comparing the at least one reference feature to at least one pre-determined reference feature of a shoe-part reference image;
determining, from the first image, a first geometric coordinate of the attachment shoe part in a geometric coordinate system;
determining, from the second image, a second geometric coordinate of the base shoe part in the geometric coordinate system;
determining, from the first image and the second image, a degree of rotation of the attachment shoe part required for alignment with the base shoe part; and
transferring, by a part-transfer apparatus, the attachment shoe part from the first geometric coordinate to the second geometric coordinate through the degree of rotation so that the attachment shoe part is aligned with the base shoe part for attachment during the shoe-manufacturing process.

15. The method of claim 14, further comprising attaching the aligned attachment shoe part to the base shoe part at the second geometric coordinate using a part-attachment device, wherein the part-attachment device comprises a welding tool, a stitching tool, or an adhering tool.

16. The method of claim 14, wherein the two-dimensional representation of the attachment shoe part is comprised of a two-dimensional shape having a perimeter, and wherein the at least one reference feature that is identified is associated with the perimeter.

17. The method of claim 14, wherein, when the first image is recorded, the attachment shoe part is either:
held by the part-transfer apparatus; or
maintained at a supply station from which the attachment shoe part is acquired by the part-transfer apparatus.

18. The method of claim 14, wherein the part-transfer apparatus utilizes at least one of a gripping structure, suction, electromagnetic forces, and surface tack.

19. The method of claim 14, wherein the first image comprises a plurality of representations of attachment shoe parts that are randomly oriented and located at a part-supply station, and wherein each representation of the plurality of representations depicts a respective attachment shoe part that is to be transferred to the second geometric coordinate for attachment to the base shoe part.

20. The method of claim 19, further comprising analyzing the plurality of representations of attachment shoe parts to determine a respective geometric coordinate of each of the attachment shoe parts that are depicted in the first image.

* * * * *